US012299774B2

United States Patent
Green et al.

(10) Patent No.: US 12,299,774 B2
(45) Date of Patent: May 13, 2025

(54) SYSTEMS AND METHODS FOR GENERATING IMAGES TO ACHIEVE A STYLE

(71) Applicant: Sony Interactive Entertainment Inc., Tokyo (JP)

(72) Inventors: Arran Green, San Diego, CA (US); Celeste Bean, San Francisco, CA (US); Michael Taylor, San Bruno, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 206 days.

(21) Appl. No.: 18/083,456

(22) Filed: Dec. 16, 2022

(65) Prior Publication Data

US 2024/0202984 A1  Jun. 20, 2024

(51) Int. Cl.
*G06T 11/00* (2006.01)
*G06F 3/01* (2006.01)
*G06F 40/166* (2020.01)
*G06F 40/284* (2020.01)
*G10L 15/18* (2013.01)

(52) U.S. Cl.
CPC .............. *G06T 11/00* (2013.01); *G06F 3/013* (2013.01); *G06F 40/166* (2020.01); *G06F 40/284* (2020.01); *G10L 15/1807* (2013.01)

(58) Field of Classification Search
CPC ...................................................... G06T 11/00
See application file for complete search history.

(56) References Cited

U.S. PATENT DOCUMENTS

| 2022/0068296 A1* | 3/2022 | Wilson ................. G06T 13/205 |
| 2023/0068103 A1 | 3/2023 | Zhou et al. |
| 2023/0230198 A1* | 7/2023 | Zhang .................... G06N 3/047 |
| | | 382/276 |
| 2024/0037810 A1* | 2/2024 | Gong .................... G06T 7/0002 |

OTHER PUBLICATIONS

PCT/US2023/081220 Notification of Transmittal of the International Search Report and the Written Opinion of the International Searching Authority, or the Declaration, PCT/ISA/220, and the International Search Report, PCT/ISA/210, Feb. 27, 2024.
Feng Fangxiang et al.: "Modality Disentangled Discriminator for Text-to-Image Synthesis", IEEE Transactions on Multimedia, IEEE USA, vol. 24, Apr. 28, 2024, pp. 2112-2124, XP011905201, ISSN: 1520-9210, DOI: 10.1109/TMM.2021.3075997.
Lee Seung Hyun et al., "Sound-Guided Semantic Image Manipulation", 2002 IEEE/CVF Conf on Computer Vision and Pattern Recognition, (CVPR), IEEE, Jun. 18, 2022, pp. 3367-3376, XP034195093, DOI: 10.1109/CVPR52688.2022.00337.

* cited by examiner

*Primary Examiner* — Shivang I Patel
(74) *Attorney, Agent, or Firm* — Kilpatrick Townsend & Stockton LLP

(57) ABSTRACT

A method generating an image according to a style is described. The method includes receiving a textual description describing a first image. The method further includes applying an artificial intelligence (AI) model to determine the style of a second image based on the textual description, the first image, a plurality of descriptions, and a plurality of images to generate a suggestion. The style provides a context to the second image. The style is lacking in the first image. The method includes generating the second image with the suggestion according to the style and providing the second image to a client device for display.

18 Claims, 16 Drawing Sheets

(God-like Character on a Beach)

(God-like Character on a Beach)

(Suggestion Based on Context)

(Word Analysis to Generate Context)

(Noun OR Verb OR Adjective to Determine Context)

(Identify noun location to determine context)

(Esoteric)

(Gaze)

(Sound)

(Feedback)

(System)

(System)

(System)

SYSTEMS AND METHODS FOR GENERATING IMAGES TO ACHIEVE A STYLE

FIELD

The present disclosure relates to systems and methods for generating images to achieve a style are described.

BACKGROUND

A process of storing, finding, retrieving, or generating one or more images stored electronically has become increasingly difficult for a variety of reasons. For instance, when a user searches for images on the Internet, an image generating algorithm produces sets of images in a random manner. With the production of the images in the random manner, an ability of computer programs to perform searching, generating, and retrieval functions in an efficient, useful, and timely manner is challenging.

It is in this context that embodiments of the invention arise.

SUMMARY

Embodiments of the present disclosure provide systems and methods for generating images to achieve a style.

In an embodiment, a method generating an image according to a style is described. The method includes receiving a textual description describing a first image. The method further includes applying an artificial intelligence (AI) model to determine the style of a second image based on the textual description, the first image, a plurality of descriptions, and a plurality of images to generate a suggestion. The style provides a context to the second image. The style is lacking in the first image. The method includes generating the second image with the suggestion according to the style and providing the second image to a client device for display.

In one embodiment, a server system for customizing an image based on user preferences is described. The server system includes a processor. The processor receives a textual description describing a first image. The processor applies an AI model to determine a style of a second image based on the textual description, the first image, a plurality of descriptions, and a plurality of images to generate a suggestion. The style provides a context to the second image. The style is lacking in the first image. The processor generates the second image with the suggestion according to the style and provides the second image to a client device for display. The server system includes a memory device coupled to the processor.

In an embodiment, a non-transitory computer-readable medium containing program instructions for generating an image according to a style is described. Execution of the program instructions by one or more processors of a computer system causes the one or more processors to carry out operations of receiving a textual description describing a first image. The operations further include applying an AI model to determine the style of a second image based on the textual description, the first image, a plurality of descriptions, and a plurality of images to generate a suggestion. The style provides a context to the second image and is lacking in the first image. The operations further include generating the second image with the suggestion according to the style and providing the second image to a client device for display.

In an embodiment, in image generation, input style constraints assist in generating textual descriptions that parallel the style. For example, a user begins to enter a textual description for modifying or generating an image and an AI model provides adjustments or suggestions to the textual description to guide the image generation toward the style. In this manner, guiding the image generation pushes the AI model into a direction, and users are able to provide weights of a weighting function to specific terms, such as words, of the textual description that provide more less emphasis on the terms. The weighting function can be automatically presented with a tag associated with each of the terms, and the users can provide feedback by adjusting dynamically the weights assigned to the terms to force or guide the AI model to generate images along the style.

In one embodiment, the user can provide in addition to the textual description, information regarding a texture or tactile surface characteristic of an example object or thing represented or to be represented in an image. For example, the user wishes to describe textures of interior walls of a building, but the textures are not well represented in an image. In the example, haptic feedback regarding the textures is provided to the user. Based on the haptic feedback, the user can provide feedback regarding the textures by modifying the textual description. For example, the haptic feedback can provide a burlap sack feel, a rough feel, a concrete feel, a density feel, or a texture feel.

In some embodiments, the weights to the terms can be provided in the form of input parameters. For example, the user shakes a hand-held controller or squeezes the hand-held controller to signify strength, speed, motion, or direction. In combination, these input parameters are used by the AI model to generate an image that is more consistent with the style desired by the user.

In one embodiment, writing of a textual description by a user is captured via a table. The tablet allows highlighting, such as underlying or circling, of one or more words of the textual description by the user to provide weights to the words. To illustrate, a word that is underlined has more weight compared to a word that is not underlined.

In an embodiment, a first word cloud with different word sizes denoting weighting of words of a textual description is provided. The first word cloud allows dynamic resizing of words of the textual description via dragging and seeing real-time updates to an image. The image is generated based on the weighting of the words.

In an embodiment, in addition to the first word cloud, a second word cloud of recommended words for a textual description is provided. A user can drag and drop one or more words from the second word cloud into the first word cloud to add terms to the textual description.

Some advantages of the herein described systems and methods include providing a manner of generating images towards a style desired by a user. One or more images are generated based on a textual description provided by the user. Weights are provided to each term of the textual description and the one or more images are generated based on the weights to achieve the style. Also, a suggestion is provided to the user regarding the style. As an example, the suggestion is provided in a form of haptic feedback or a textual description. The user indicates acceptance or denial of the suggestion. The denial can be used to modify the one or more images to achieve the style.

Other aspects of the present disclosure will become apparent from the following detailed description, taken in

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for generating images to achieve a style are described. It should be noted that various embodiments of the present disclosure are practiced without some or all of these specific details. In other instances, well known process operations have not been described in detail in order not to unnecessarily obscure various embodiments of the present disclosure.

Figure 1:
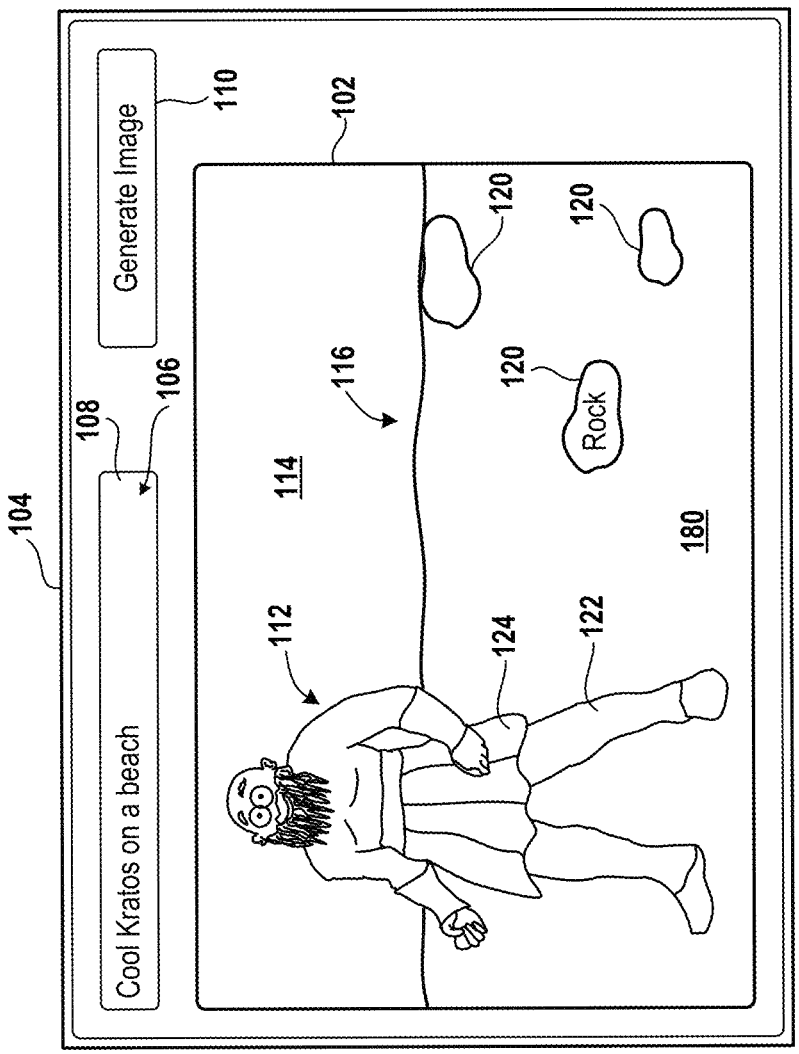
FIG. 1 is a diagram of an embodiment of a system to illustrate generation of an image on a display device.
Figure 1:
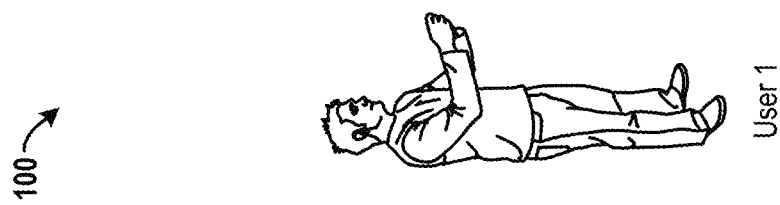

FIG. 1 is a diagram of an embodiment of a system 100 to illustrate generation of an image 102 on a display device 104. As an example, the image 102 includes a virtual character 112, such as Kratos™, a virtual ocean 114, and a virtual beach 116. The virtual beach 116 has virtual sand 118 and multiple virtual rocks 120. Also, the virtual character 112 is wearing virtual pants 122 with a virtual covering 124 to cover a top portion of the virtual pants 122.

The system 100 includes the display device 104. Examples of a display device, as used herein, include a liquid crystal display (LCD) device, a light emitting diode (LED) device, and a plasma display. The display device has a display screen, such as a touchscreen, and is a standalone device or a part of a client device. Examples of a client device, as used herein, include a desktop computer, a laptop computer, a head-mounted display (HMD), a television, a smart television a smart phone, a tablet, a combination of a game console and the HMD, a combination of the game console and the smart television, and a combination of the game console and the television.

The user 1 uses an input device to access a webpage or an application from a computing device via a computer network. Examples of the input device include a hand-held controller, a stylus, a mouse, a keyboard, the touch screen, a microphone, and a keypad. An example of the webpage is one that allows generation of an image based on a textual description of the image. Also, an example of the application is one that allows generation of an image based on a textual description of the image. The webpage or the application is accessed by the client device and displayed on the display device 104. After the webpage or the application is displayed, the user 1 uses the input device to provide a textual description 106 within a text field 108 displayed on the webpage or the application. An example of the textual description 106 is "Cool Kratos on a beach".

After providing the textual description 106, the user selects a generate image button 110 for producing a request to generate the image 102 based on the textual description 106. For example, when the user 1 selects the generate image button 110, the client device generates a request for generating an image based on the textual description 106 and sends the request with the textual description 106 via the computer network to a server system, described below. The server system executes an artificial intelligence image generation (IGAI) model to generate image data for displaying the image 102 and sends the image data via the computer network to the client device. Upon receiving the image data, the client device displays the image 102 on the display device 104.

In an embodiment, the user 1 does not access a user account assigned to the user before providing the textual description 106. For example, there is no need for the user 1 to log into the user account before providing the textual description 106. In the example, the server system assigns the user account to the user.

Figure 2:
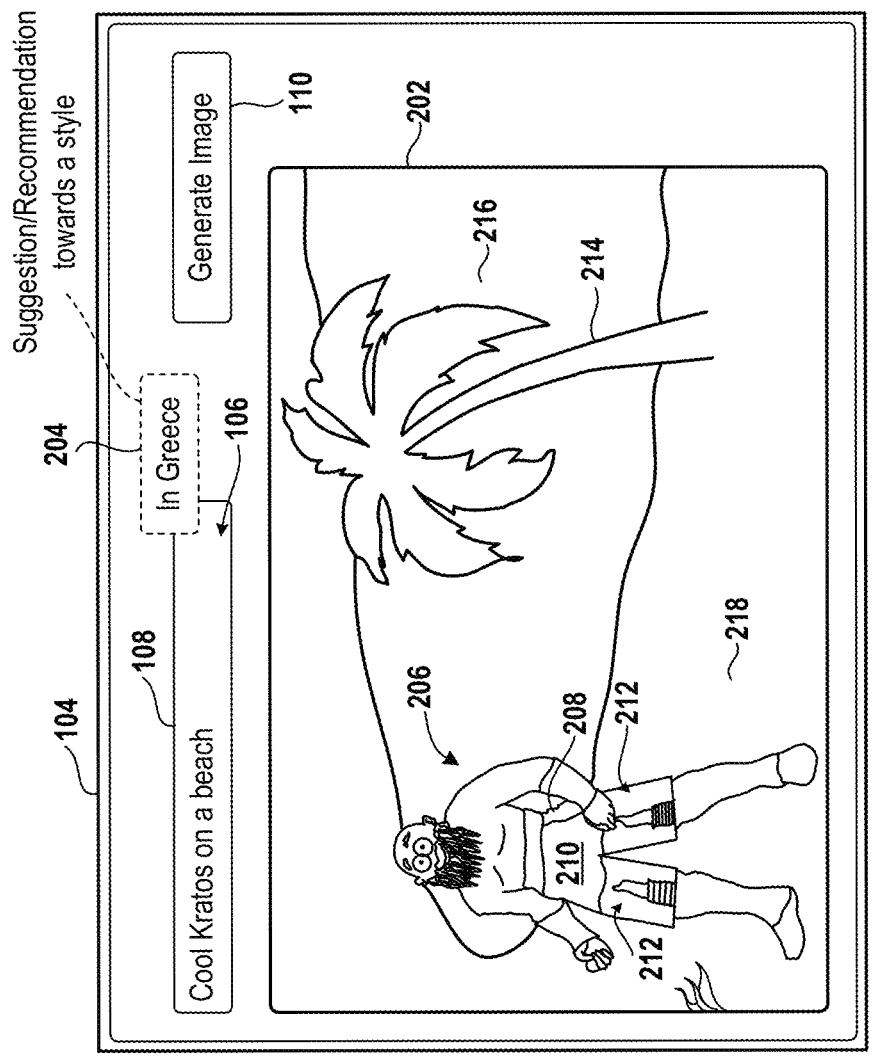
FIG. 2 is a diagram of an embodiment of a system to illustrate an application of systems and methods described herein to generate an image having a style, such as a context, based on a textual description.
Figure 2:
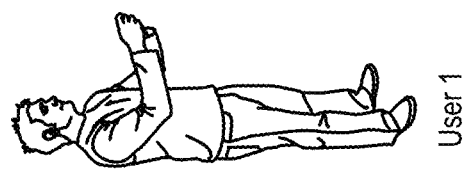

FIG. 2 is a diagram of an embodiment of a system 200 to illustrate an application of the systems and methods described herein to generate an image 202 having a style, such as a context, based on the textual description 106. The system 200 includes the display device 104. After the user 1 provides the textual description 106 within the text field 108, the server system generates a suggestion 204 based on the textual description 106. For example, upon receiving the request for generating an image based on the textual description 106 via the computer network from the client device operated by the user 1, the server system applies one or more AI models to generate suggestion data for displaying the suggestion 204 based on the textual description 106, such as the word Kratos™ in the textual description 106. An example of the suggestion 204 is a textual description. To illustrate, the suggestion 204 is a set of words describing the suggestion 204. The server system sends the suggestion data via the computer network to the client device for display of the suggestion 204 on the display device 104.

The user 1 views the suggestion 204 and interacts with the suggestion 204 to provide a response to the suggestion 204. For example, the user 1 uses the input device to provide the response indicating an acceptance or a denial for implementing the suggestion 204 to generate the image 202. To illustrate, when the user 1 uses the input device to select the suggestion 204, the client device sends an acceptance of the suggestion 204 via the computer network to the server system. In the illustration, upon receiving the acceptance, the one or more AI models comprehend that the textual description 106 is to be appended with the suggestion 204. In the illustration, the textual description 106 appended with the suggestion is also a textual description. In the illustration, on the other hand, when the user 1 uses the input device to modify a textual description of the suggestion 204 to provide a modified textual description, the client device sends the modified textual description to the server system. In the example, the image 202 is not displayed on the client device operated by the user 1 and image data of the image 202 is not generated by the server system before the response is received by the server system.

The server system applies the one or more AI models to generate image data for displaying the image 202 based on the response received from the user 1 and additional responses received from additional users. For example, upon receiving the acceptance of the suggestion 204, the server system generates the image data for displaying the image 202. To illustrate, the server system generates image data for displaying a virtual character 206, such as Kratos™, except that the virtual character 206 is wearing virtual beach shorts 208. In the illustration, the virtual beach shorts 208 include a virtual ocean 210 in Greece and virtual stacks 212 of rocks on a beach in Greece. In the illustration, the virtual stacks 212 of rocks indicate that the virtual ocean 210 is in Greece. Also, in the illustration, the image 202 includes a virtual Palm tree 214, a virtual ocean 216, and a virtual beach 218. The virtual Palm tree 214, the virtual ocean 216, and the virtual beach 218 illustrate an image of a real beach in Greece. In the illustration, Greece, the virtual beach shorts 208, the virtual ocean 210 in Greece, the virtual stacks 212 of rocks, the virtual Palm tree 214, the virtual ocean 216, and the virtual beach 218 are examples of the style. It should be noted that in the image 102, the virtual beach shorts 208, the virtual ocean 210 in Greece, the virtual stacks 212 of rocks, the virtual Palm tree 214, the virtual ocean 216, and the virtual beach 218 are not included, and therefore the image 102 is lacking the style of the image 202. The additional responses are to additional suggestions generated by the server system, and the additional suggestions are generated by the server system by applying the one or more AI models.

As another example, upon receiving the modified textual description of the suggestion 204, the server system comprehends the modified textual description as a denial of the suggestion 204 and generates image data for displaying another image (not shown) based on the denial. To illustrate, the server system generates image data of an image for displaying a virtual character, such as Kratos™, except that the virtual character is wearing a hoodie and pants instead of the virtual beach shorts 208. In the illustration, the one or more AI models of the server system determine, based on the denial, that the word Kratos™ is not to be used to generate a context of the image but another word, such as the word "Cool", in the textual description 106 is to be used to generate the context. In the illustration, the server system generates the image data and sends the image for display on the display device 104.

In an embodiment, the image 202 is displayed on the client device operated by the user 1 and the image data of the image 202 is generated by the server system with the suggestion data for the suggestion 204 before the response to the suggestion 204 is received by the server system from the client device. In the example, the image 202 is modified by the server system based on the response.

In one embodiment, instead of the suggestion 204, a suggestion that is reordering of words of the textual description 106 is generated by the one or more AI models of the server system and provided from the server system to the client device operated by the user 1. For example, the suggestion is "Beach having Cool Kratos™" or "Beach with Cool Kratos".

In one embodiment, instead of the textual description 106, a textual description that is a paragraph long is received from the user 1 via the input device. In the embodiment, a suggestion that reduces a number of words of the paragraph is generated by the one or more AI models of the server system and provided from the server system to the client device operated by the user 1. For example, the suggestion is a sentence or a statement.

Figure 3:
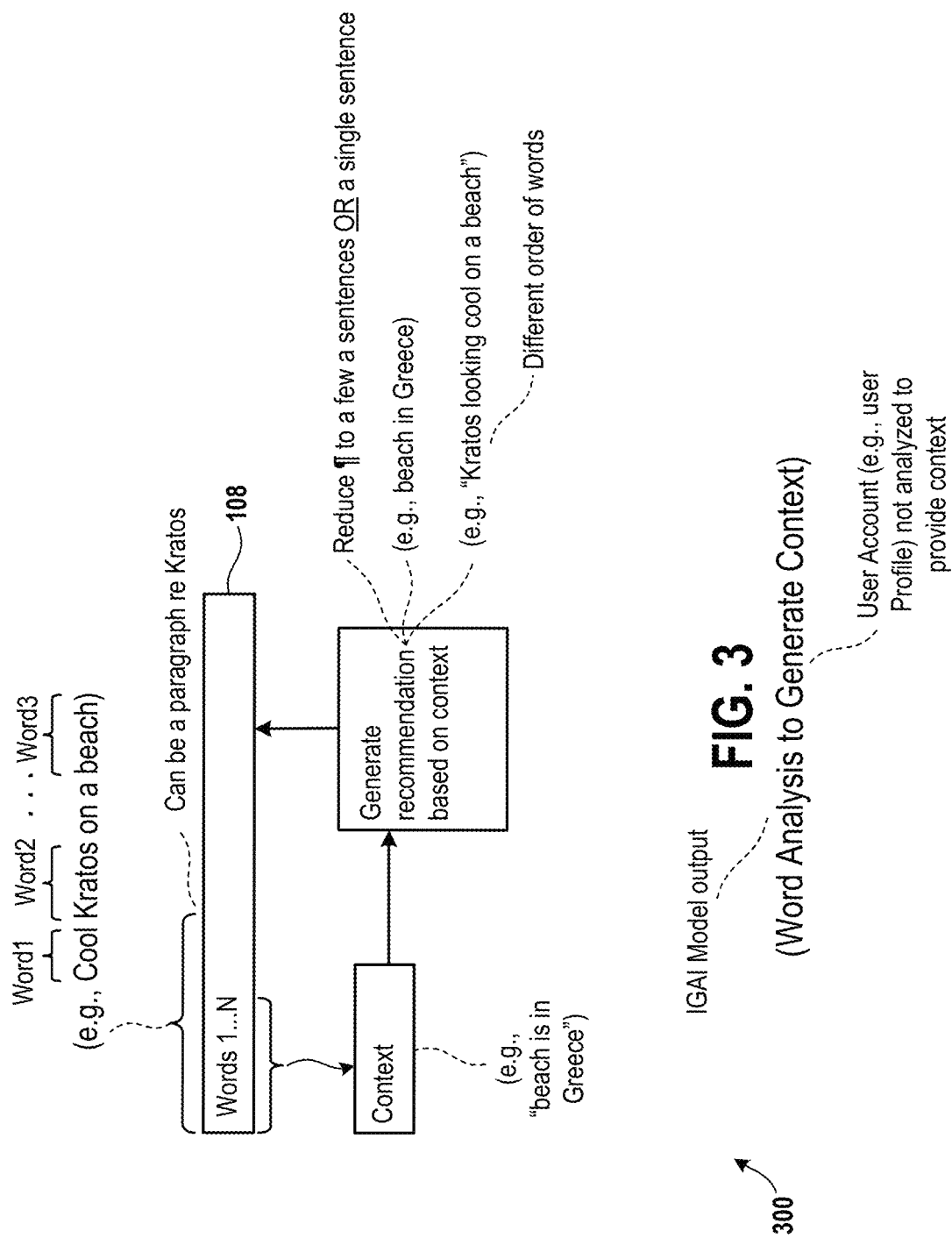
FIG. 3 is a diagram of an embodiment of a system to illustrate generation of a recommendation, such as a suggestion, based on the context.

FIG. 3 is a diagram of an embodiment of a system 300 to illustrate generation of a recommendation based on the context. The system 300 includes the text field 108. The user 1 uses the input device to provide words 1 through N in the text field 108, where N is a positive integer. For example, the user 1 uses the input device to provide the textual description 106, such as "Cool Kratos on a beach". In the example, "Cool" is the word 1, "Kratos" is the word 2 and so until "beach" is the word N. As another example, the words 1 through N form a paragraph regarding Kratos™.

Upon receiving the words 1 through N of a textual description, such as the textual description 106, with the request for generating an image based on the textual description, the server system executes the one or more AI models to determine the context based on the words 1 through N. For example, the one or more AI models determine that the context is that the beach is in Greece. To illustrate, based on data used for training the one or more AI models, the one or more AI models analyze the words 1 through N to determine that the word N, e.g., "beach", means "beach in Greece". In the illustration, the word N, "beach" is understood by the one or more AI models to mean "beach in Greece". As another illustration, based on the data used for training the one or more AI models, the one or more AI models determine that the words 1 through N mean "Kratos looking cool on a beach in Greece". The meaning "Kratos looking cool on a beach in Greece" have a different order of words compared to the words "Cool Kratos on a beach".

Based on the context, the one or more AI models generate recommendation data for displaying a recommendation. For example, the one or more AI models generate suggestion data for displaying the suggestion 204 (FIG. 2). As another example, the one or more AI models generate suggestion data for displaying a suggestion, "Kratos looking cool on a beach in Greece", which is the same as the meaning of the words "Cool Kratos on a beach".

The server system sends the recommendation data via the computer network to the client device operated by the user 1. Upon receiving the recommendation data, the client device operated by the user 1 displays the recommendation on the display device 104. For example, the recommendation is displayed on a top right corner of the text field 108 or another corner of the text field 108 to not obstruct the textual description 106.

The user 1 uses the input device to accept or deny a suggestion displayed on the display device 104. For example, the user 1 uses the input device to select the suggestion 204 to accept the suggestion 204. Once the user selects the suggestion 204, the client device sends an indication of the acceptance via the computer network to the server system. As another example, the user 1 does not select the suggestion 204 within a predetermined time period to deny the suggestion 204. Once the user does not select the suggestion 204 within the predetermined time period, the client device sends an indication of the denial via the computer network to the server system. Upon receiving the indication, the one or more AI models determine that the suggestion 204 is not selected within the predetermined time period to comprehend the lack of the selection as the denial. As yet another example, the user 1 uses the input device to continue providing further textual description in the text field 108 after receiving the suggestion 204 to deny the suggestion 204. In the example, the further textual description is sent from the client device via the computer network to the server system to indicate the denial of the suggestion 204 to the one or more AI models. Upon receiving the denial of the suggestion 204, the server system applies the one or more AI models to determine to generate additional suggestion data for generating another suggestion or modifying the suggestion, such as the suggestion 204, previously displayed. Upon determining so, the server system generates the additional suggestion data and sends the additional suggestion data via the computer network to the client device. Upon receiving the additional suggestion data, the client device displays an additional suggestion instead of the suggestion 204 previously displayed. The user 1 uses the input device to accept or deny the additional suggestion in the same manner in which the user 1 uses the input device to accept or deny the suggestion 204 previously displayed.

Figure 4:
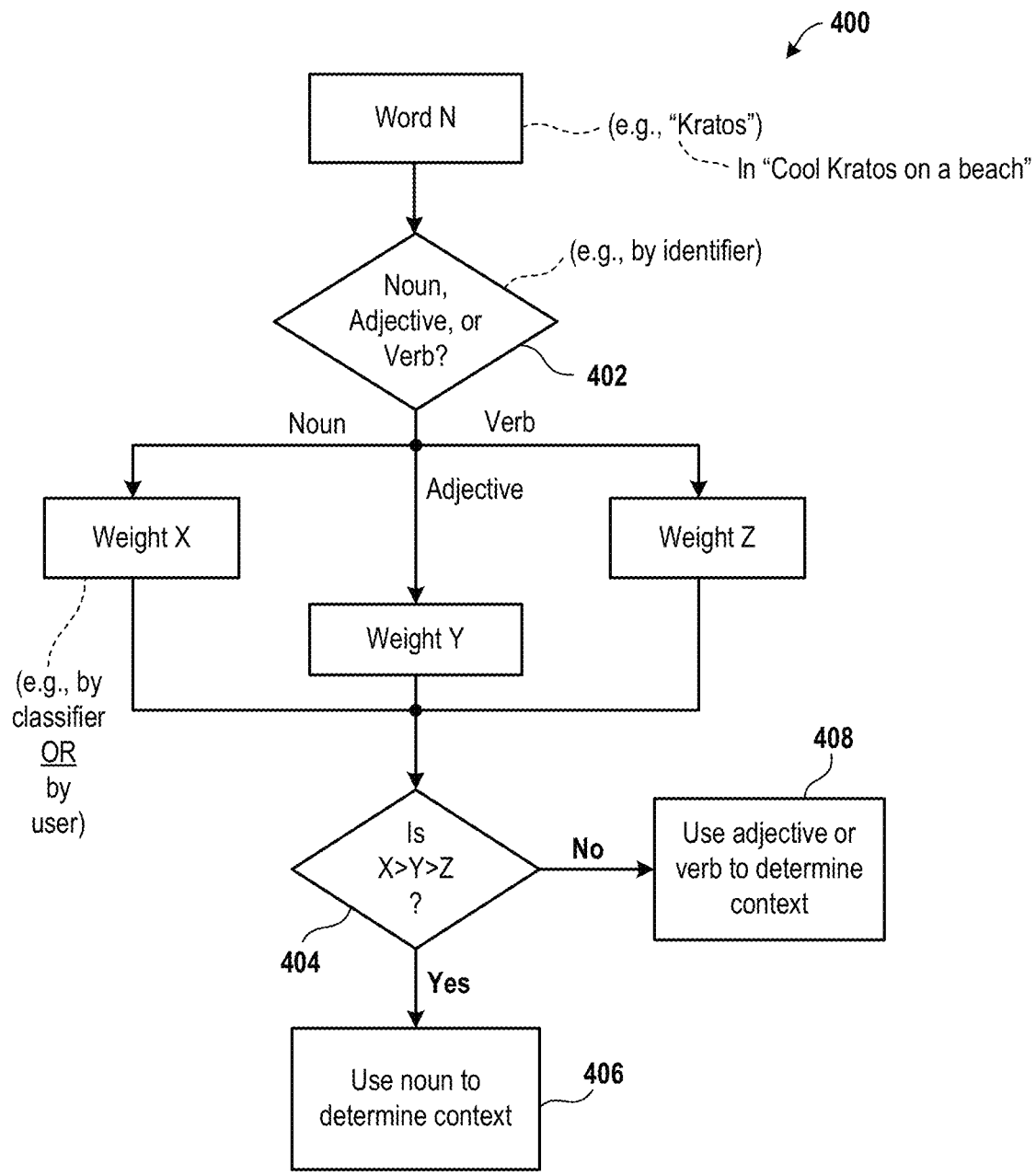
FIG. 4 is a diagram of an embodiment of a method to illustrate an application of a weight to each word of a textual description based on a lexical category of the word.

FIG. 4 is a diagram of an embodiment of a method 400 to illustrate application of weights to each of the words 1 through N based on a lexical category. In an operation 402 of the method 400, the one or more AI models determine the lexical category, such as noun, verb, or adjective, of and assign the lexical category to each of the words 1 through N. For example, the one or more AI models are trained using various words and various lexical categories prior to executing the operation 402. In the example, the one or more AI models are provided with each of the different words followed by a respective one of the lexical categories within a predetermined time period to train the AI models. In the example, after being trained, the one or more AI models determine that the word N of the textual description 106 is similar, in meaning or connotation or sound or a combination thereof, to a predetermined number, such as a majority, of the different words. As an example, upon determining that the word N is similar to the different words of the predetermined number, the one or more AI models determine that it is probable that the word N has one of the lexical categories that is the same as a lexical category of the different words of the predetermined number.

Moreover, in the example, the one or more AI models are trained to determine the similarity between the word N and each of the different words of the predetermined number. To illustrate, the one or more AI models are provided with the word N and within a preset time period are provided with one or more of the different words that are similar to the word N to train the one or more AI models. In the illustration, upon receiving the word N and the one or more of the different words that are similar to the word N, the one or more AI models are trained to determine that the word N is similar to the one or more of the different words of the predetermined number.

The noun is an example of a first one of the lexical categories, the adjective is an example of the second one of the lexical categories, and the verb is an example of the third one of the lexical categories. Upon determining that the word N falls into the first lexical category, the one or more AI models assign a weight X to the first lexical category, where X is a real number. For example, the one or more AI models are trained to determine and assign weights to each of the lexical categories. In the example, the server system executes the one or more AI models to send one or more requests to one or more client devices operated by one or more users to assign one or more weights to one or more words. Each of the one or more words falls into a respective one of the lexical categories. To illustrate, the server system sends a request to assign a weight via the computer network to the client device operated by the user 1. In the illustration, the request is sent upon receiving a textual description with a request for generating an image based on the textual description. In the illustration, the request is to assign weights to one or more words of the textual description.

Continuing with the example, the one or more requests are displayed on one or more display devices of the one or more client devices. In the example, upon viewing the one or more requests on the one or more display devices, the one or more users use one or more input devices to assign the one or more weights to the one or more words. The one or more client devices, in the example, send the one or more weights via the computer network to the server system. In the example, the one or more AI models identify a correspondence, such as a one-to-one relationship, between one of the lexical categories, each of the one or more words, and a respective one of the one or more weights to be trained. Further, in the example, the one or more AI models identify that the weight X is assigned to a predetermined number of the one or more words of the one of the lexical categories.

In a manner similar to assigning the weight X to the first lexical category, upon determining that the word (N–1) falls into the second lexical category, the one or more AI models assign another weight Y to the second lexical category, where Y is a real number. Also, in a manner similar to assigning the weight X to the first lexical category, upon determining that the word (N–2) falls into the third lexical category, the one or more AI models assign yet another weight Z to the third lexical category, where Z is a real number.

Upon assigning the weights to the lexical categories of the words 1 through N of the textual description 106, the server system compares, in an operation 404 of the method 400, the weights among X, Y, and Z to identify an increasing order or decreasing order of magnitude of the weights X, Y, and Z. For example, the server system determines that the weight X is greater than the weight Y and the weight Y is greater than the weight Z. On the other hand, in the example, the server system determines that it is not the case that X>Y>Z. It should be noted that as an example, Z is unequal to X and to Y, and X is unequal to Y. To illustrate, X is greater than Y and Y is greater than Z. As another example, at least two but not all of X, Y, and Z are equal.

In an operation 406 of the method 400, upon determining that the greatest weight X is assigned to the word N, the one or more AI models determine that the word N, which falls into the first lexical category, be used to determine the context of the image, such as the image 202. The image, such as the image 202, is to be generated based on the textual description, such as the textual description 106. On the other hand, in an operation 408 of the method 400, upon determining that the greatest weight X is assigned to the word (N−1), the one or more AI models determine that the word (N−1), which falls into the second lexical category, be used to determine the context of the image, such as the image 202. Also, in the operation 408 of the method 400, upon determining that the greatest weight X is assigned to the word (N−2), the one or more AI models determine that the word (N−2), which falls into the third lexical category, be used to determine the context of the image, such as the image 202.

Figure 5:
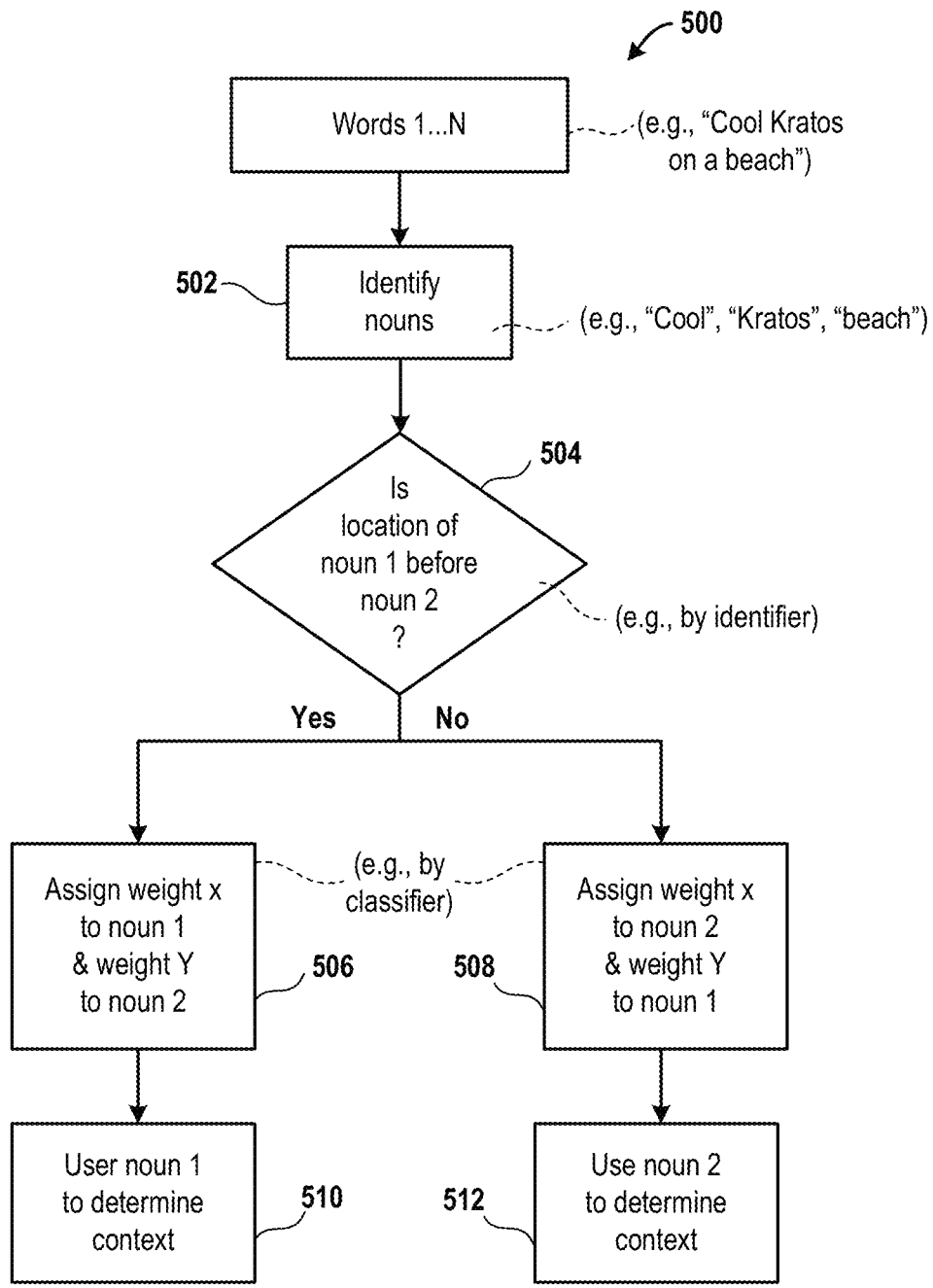
FIG. 5 is a diagram of an embodiment of a method to illustrate an application of weights to two or more words of the same lexical category in a textual description.

FIG. 5 is a diagram of an embodiment of a method 500 to determine application of weights to two or more of the words 1 through N of the same lexical category. In an operation 502 of the method 500, the server system executes the one or more AI models to determine and assign the lexical categories to the words 1 through N of the textual description 106 received via the text box 108 (FIG. 2). The server system, in the operation 502, identifies two or more of the words 1 through N having one of the lexical categories. For example, the server system compares the first, second, or third lexical category of a respective one of the words 1 through N with a predetermined lexical category. To illustrate, the predetermined lexical category is the first, second, the third lexical category. In the example, the server system determines that the one of the lexical categories, such as the first, second, third lexical category, matches the predetermined lexical category based on the comparison. In the example, the server system determines that the words 1 and 2 are of the predetermined lexical category.

In an operation 504 of the method 500, the server system determines locations of the two or more of the words 1 through N having the predetermined lexical category. For example, the server system determines whether the word (N−1) is before the word N in the textual description 106 or after the word N in the textual description 106 received within the text box 108 (FIG. 2). In the example, the word (N−1), which is a noun, is illustrated in FIG. 5 as noun 1. Also, in the example, the word N, which is also a noun, is illustrated in FIG. 5 as noun 2.

Upon determining in the operation 504 that the word (N−1) has the location before the location of the word N in the textual description 106, in an operation 506 of the method 500, the one or more AI models assign a greater weight to the word (N−1) compared to a weight assigned to the word N. For example, the server system assigns the weight X to the word (N−1) and the weight Y to the word N, where X is greater than Y. To illustrate, the one or more AI models are trained to assign the greater weight to a word of a lexical category within the textual description 106 that is located before another word of the same lexical category in the textual description 106. In the illustration, upon receiving multiple textual descriptions from multiple users via multiple client devices, the server system identify, within each of the textual descriptions, words having the same lexical category. Further in the illustration, upon identifying the words having the same lexical category, the server system sends a request via the computer network to the client devices for providing weights to each of the words. In the illustration, in response to the request, the users use the client devices to respond to the request and provide the weights to the words. Also, in the illustration, the client devices send the weights via the computer network to the server system. Further, in the illustration, the one or more AI models are trained based on the weights provided to the words of the same lexical category by the users. In the illustration, the one or more AI models receive the textual description 106 having the words 1 through N and determine a similarity between the textual description 106 having the words 1 through N and a predetermined number, such as a majority, of the multiple textual descriptions based on which the one or more AI models are trained.

Further, in the illustration, upon determining that the textual description 106 having the words 1 through N is similar to the predetermined number of the multiple textual descriptions, the one or more AI models determine to assign weights to two or more of the words 1 through N having the lexical category in the same manner in which the weights are assigned to the words of the predetermined number of the multiple textual descriptions. To further illustrate, when the one or more AI models are trained to assign the weight X to a first word in a first textual description and the weight Y to a second word in the first textual description, assign the weight X to a first word in a second textual description and the weight Y to a second word in the second textual description, and assign the weight Y to a first word in a third textual description and the weight X to a second word in the third textual description, the one or more AI models determine to assign the weight X to the word (N−1) in the textual description 106 and the weight Y to the word N in the textual description 106. In the further illustration, the first words of the first through third textual descriptions, the second words of the first through third textual descriptions, the word (N−1) of the textual description 106, and the word N of the textual description 106 belong to the same lexical category. In the further illustration, the first word of each of the first through third textual descriptions occurs before the second word of the textual description and the word (n−1) occurs before the word N. In the further illustration, the one or more AI models are trained based on the first, second, and third textual descriptions, and after being trained, receives the textual description 106 with a request for generating an image based on the textual description 106.

On the other hand, upon determining in the operation 504 that the word N has the location before the location of the word (N−1) in the textual description 106, in an operation 508 of the method 500, the one or more AI models assign a greater weight to the word N compared to a weight assigned to the word (N−1). For example, the server system assigns the weight X to the word N and the weight Y to the word (N−1), where X is greater than Y. The same illustration as that described above with reference to the operation 506 applies here except that the greater weight X is applied to the word N and the lesser weight Y is assigned to the word (N−1).

In an operation 510 of the method 500, upon determining that the greatest weight X is assigned to the word (N−1), the one or more AI models determine that the word (N−1), instead of the word N, be used to determine the context of the image, such as the image 202, to be generated based on the textual description 106. On the other hand, in an operation 512 of the method 500, upon determining that the greatest weight X is assigned to the word N, the one or more AI models determine that the word N, instead of the word (N−1), be used to determine the context of the image, such as the image 202, to be generated based on the textual description 106.

Figure 6:
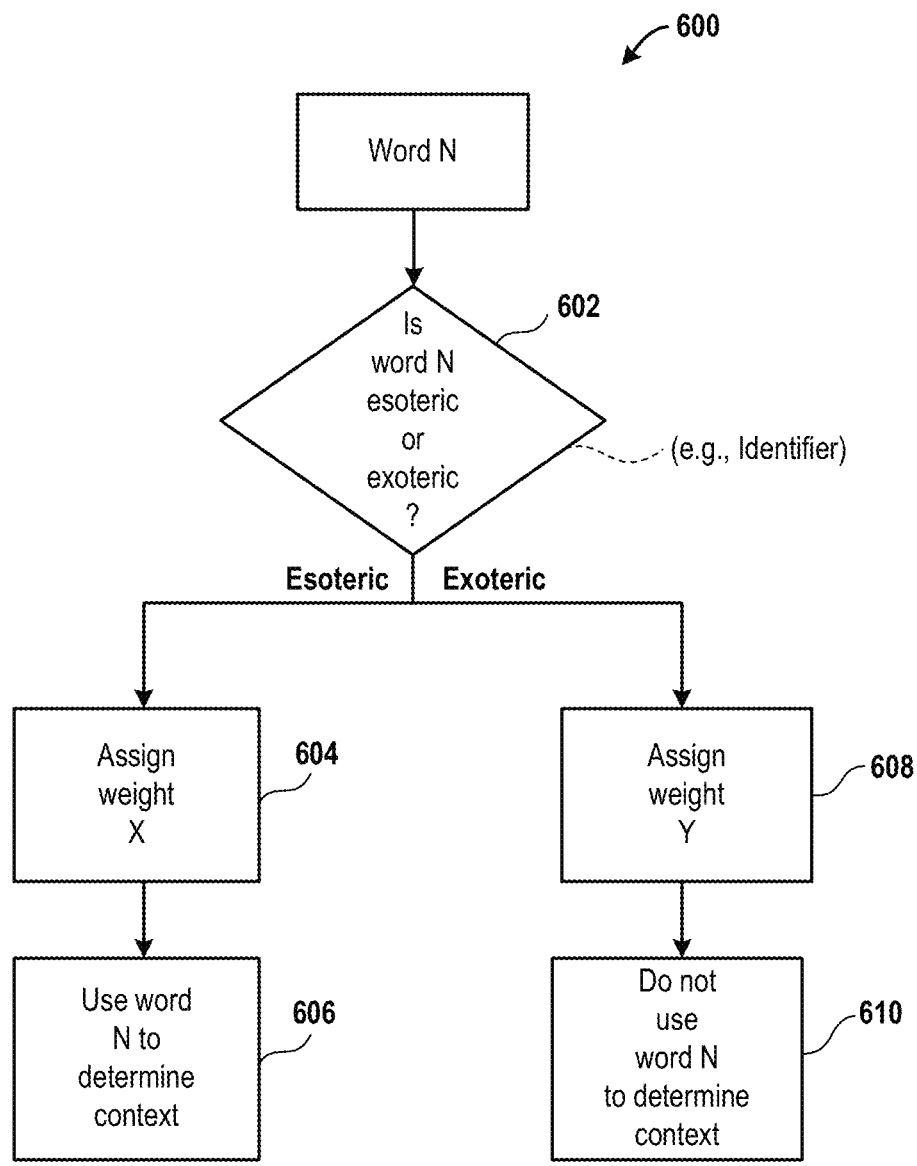
FIG. 6 is a diagram of an embodiment of a method to illustrate a determination of context based on whether a word of a textual description is esoteric or exoteric.

FIG. 6 is a diagram of an embodiment of a method 600 to illustrate application of context based on whether the word N of the textual description 106 (FIG. 2) is esoteric or exoteric. In an operation 602 of the method 600, it is determined whether the word N of the textual description 106 is esoteric or exoteric. For example, it is determined by the one or more AI models of the server system whether one of the words, such as "Kratos", in the textual description 106 (FIG. 2) is exoteric or esoteric. To illustrate, upon receiving a first set of textual descriptions from multiple client devices via the computer network, the server system generates requests to the users operating the client devices to recognize each word of the textual descriptions of the first set, and sends the requests via the computer network to the client devices. In the illustration, the users use the input devices to indicate whether they can recognize the words of the textual descriptions of the first set, and the client devices send indications of whether the users can recognize the words via the computer network to the server system. In response to the requests, in the illustration, the server system receives responses indicating whether each of the words of the textual descriptions of the first set can be recognized. In the illustration, the responses are used to train the one or more AI models to identify whether the word N is esoteric or exoteric. For instance, in a predetermined number, such as a minority, of the textual descriptions of the first set, users using the client devices cannot recognize the word "Kratos" or "Cratos", and indicate the same to the one or more AI models. Continuing with the illustration, upon receiving the word Kratos™ in the textual description 106, the one or more AI models determine whether the word is similar to, such as having the same meaning as that of or connotation as that of or a combination thereof, the word "Kratos" or "Cratos" in the textual descriptions of the first set. Upon determining so, in the illustration, the one or more AI models, which are trained to determine that the word "Kratos" or "Cratos" in the predetermined number of textual descriptions of the first set is not recognized, determine that the word, "Kratos", in the textual description 106 is esoteric.

In the example, it is determined by the server system whether one of the words, such as "Cool", in the textual description 106 (FIG. 2) is exoteric or esoteric. To illustrate, upon receiving a second set of textual descriptions from multiple client devices via the computer network, the server system generates requests to the users operating the client devices to recognize each word of the textual descriptions of the second set, and sends the requests via the computer network to the client devices. In the illustration, the users use the input devices to indicate whether they can recognize the words of the textual descriptions of the second set, and the client devices send indications of whether the users can recognize the words via the computer network to the server system. In response to the requests, in the illustration, the server system receives responses indicating whether each of the words of the textual descriptions of the second set can be recognized. In the illustration, the responses are used to train the one or more AI models to identify whether the word N is esoteric or exoteric. For instance, in a preset number, such as a majority, of the textual descriptions of the second set, users using the client devices can recognize the word "Cool" or "Awesome", and indicate the same to the one or more AI models. In the illustration, upon receiving the word, "Cool", in the textual description 106, the one or more AI models determine whether the word is similar to, such as having the same meaning as that of or connotation as that of or a combination thereof, the word "Cool" or "Awesome" in the textual descriptions of the second set. Upon determining so, in the illustration, the one or more AI models, which are trained to determine that the word "Cool" or "Awesome" in the preset number of textual descriptions of the second set is recognized, determine that the word, "Cool", in the textual description 106 is exoteric. As an illustration, instead of the second set of textual descriptions, the first set of textual descriptions in the example is used.

Upon determining that the word N is esoteric, the server system assigns, in an operation 604 of the method 600, the weight X to the word N, and the weight X is greater than weights assigned to remaining words in the textual description 106. In an operation 606 of the method 600, upon determining that the greatest weight X is assigned to the word N, the one or more AI models determine that the word N, instead of the remaining words in the textual description 106, be used to determine the context of the image, such as the image 202, to be generated based on the textual description 106.

On the other hand, upon determining that the word N is exoteric, the server system assigns, in an operation 608 of the method 600, the weight Y to the word N, and the weight Z is lower than weights assigned to remaining words in the textual description 106. In an operation 610 of the method 600, upon determining that the lowest weight Z is assigned to the word N, the one or more AI models determine that the word N not be used to determine the context of the image, such as the image 202, to be generated based on the textual description 106.

It should be noted that in an embodiment in case there are two or more esoteric words in the textual description 106, a method, such as the method 500 (FIG. 5), for assigning weights to the two or more esoteric words based on locations of the esoteric words is applied by the one or more AI models. For example, when it is determined by the one or more AI models that both the words (N−1) and N are esoteric in the textual description 106, the one or more in models are trained to assign a greater weight to the word (N−1) compared to the word N, and the context of the image, such as the image 202, is determined based on the word (N−1) instead of the word N. In the example, the word (N−1) occurs before the word N in the textual description 106.

Figure 7:
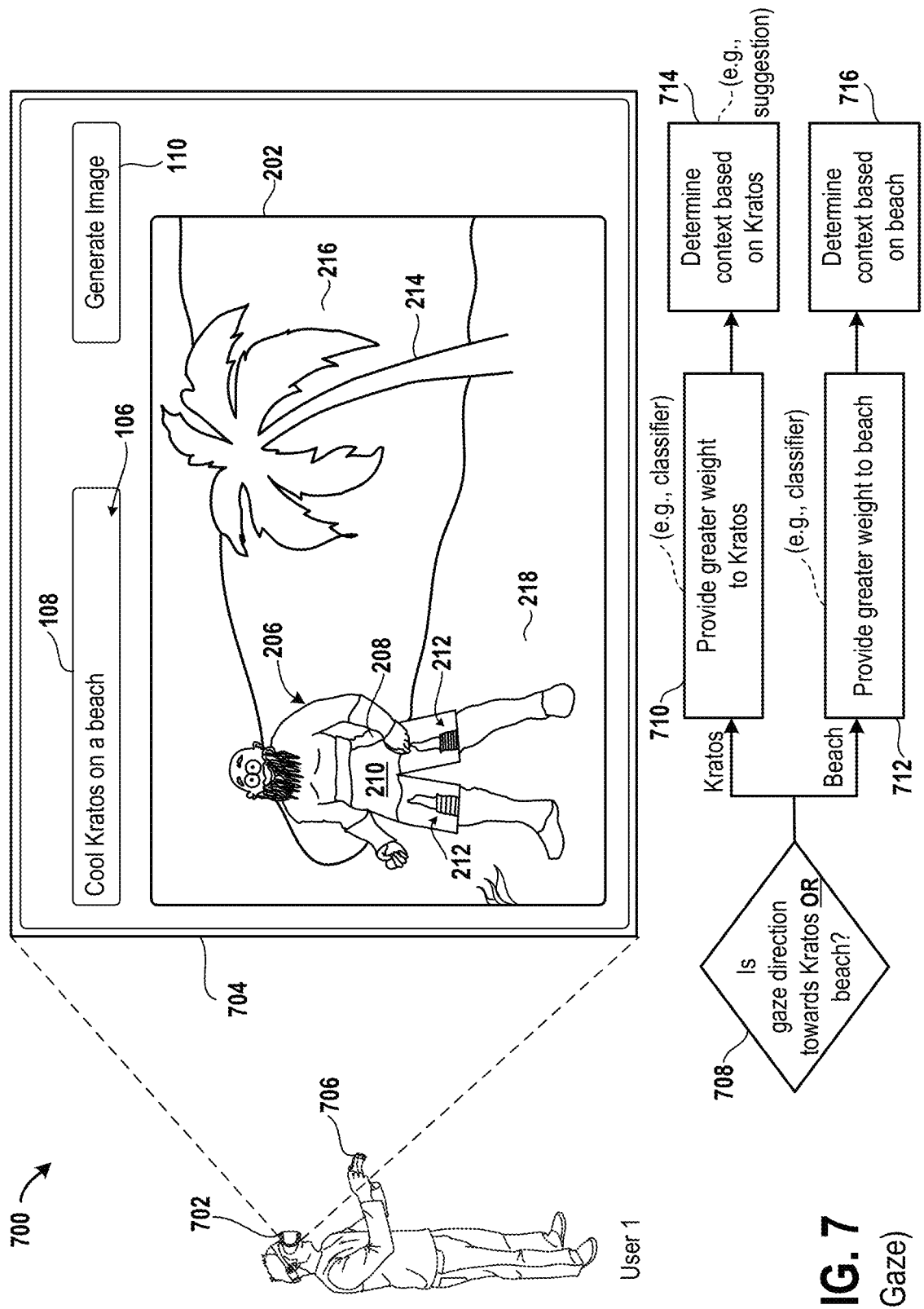
FIG. 7 is a diagram of an embodiment of a system to illustrate a use of gaze direction to determine a context of an image generated based on a textual description.

FIG. 7 is a diagram of an embodiment of a system 700 to illustrate a use of gaze direction to determine the context of the image, such as the image 202, generated based on the textual description 106 (FIG. 2). The system 700 includes a head-mounted display (HMD) 702 that is worn by a user 1. The HMD 702 has a display screen 704 on which the images 102 (FIG. 1) and the image 202 can be displayed. For example, the image 102 is displayed on the display screen 704 before the image 202 is displayed. The system 700 further includes a hand-held controller 706, which is held by the user 1 in his/her hands.

The hand-held controller 706 and the HMD 702 together form an example of the client device operated by the user 1. The hand-held controller 706 communicates with the HMD 702 via a wireless link, such as Bluetooth™ or another short-range communication medium. Moreover, the HMD 702 includes a wireless circuit, such as a network interface card (NIC), that allows the HMD 702 to communicate with the computer network.

The HMD 702 includes one or more outside-in facing cameras, such as digital cameras or video cameras, that capture images of eyes of the user 1 to determine a gaze of the user 1 towards the image 102. In addition to gazing at the image 102, the user 1 uses the hand-held controller 706 to provide the textual description 106 in the text field 108 displayed on the display screen 102. After providing the textual description 106, the user 1 uses the hand-held controller 706 to select the generate image button 110 to generate a request for generating the image 202. The hand-held controller 706 sends an indication of the selection of the generate image button 110 via the wireless link to the HMD 702. Upon receiving the indication of the selection, a processor of the HMD 702 obtains, from the one or more outside-in facing cameras, images of the gaze captured within a predetermined time period by the one or more outside-in facing cameras, and controls the wireless circuit of the HMD 702 to send the images via the computer network to the server system. Examples of a processor, as used herein, include a central processing unit (CPU), a microprocessor, an application specific integrated circuit (ASIC), a programmable logic device (PLD), and a microcontroller. The processor of the HMD 702 is coupled to the one or more outside-in facing cameras and to the NIC of the HMD 702. An example of the predetermined time period is a time interval before receiving, by the HMD 702, the indication of the selection from the hand-held controller 706. Another example of the predetermined time period is a time interval that includes a time period before an indication of the selection is received and the time period during which the indication of the selection is received. Yet another example of the predetermined time period is a time interval during which the indication of the selection is received and a time interval after receiving the indication of the selection. Still another example of the predetermined time period is a time interval after receiving the indication of the selection.

The HMD 702 sends the images representing the gaze of the user 1 towards the image 102 with the indication of the selection of the generate image button 110 via the computer network to the server system. Upon receiving the images representing the gaze of the user 1 with the indication of the selection of the generate image button 110, the one or more AI models, which are trained, determine the gaze of the user 1, and from the gaze, determine the context based on which the image 202 is to be generated.

The context is determined based on the gaze of the user 1 received with the request for generating the image 202. For example, the server system generates and sends multiple images, such as the image 102 (FIG. 1), to multiple client devices in response to receiving multiple textual descriptions, which are similar to each other, with requests to generate the images. In addition, in the example, the server system sends requests to capture images of gazes of users operating the client devices. In the example, the images are displayed on display devices of the client devices. In the example, in response to receiving the images with the requests to capture the images, cameras of the client devices capture the images of the gazes of the users and the client devices send the images of the gazes of the users via the computer network to the server system.

Upon receiving the images of the gazes of the users, in the example, the server system determines directions of the gazes of the users. To illustrate, in an operation 708 of the method 700, the one or more AI models determine that the user 1 is gazing in a direction of Kratos in the image 102 (FIG. 1) rather than in a direction of the virtual beach 116 (FIG. 1) around Kratos in the image 102. On the other hand, in the operation 708, the server system determines that the user 1 is gazing in the direction of the virtual beach 116 in the image 102 rather than in the direction of the Kratos in the image 102. Continuing with the illustration, upon determining that the user 1 is gazing in the direction of Kratos in the image 102, the server system, in an operation 710, assigns a greater weight to Kratos in the image 102 compared to the virtual beach 116. In the illustration, upon determining that the user 1 is gazing in the direction of the virtual beach 116, the server system, in an operation 712, assigns a greater weight to the virtual beach 116 compared to Kratos in the image 102.

Continuing with the example, the one or more AI models are trained based on the images of the gazes of the users and the images, such as the image 102, displayed on the client devices. To illustrate, the one or more AI models receive a predetermined number, such as a majority, of the images in which one or more of the users are gazing at Kratos rather than at virtual beaches of the images. As another illustration, the one or more AI models receive a preset number, such as a majority, of the images in which one or more of the users are gazing at the virtual beaches rather than at Kratos.

In the example, upon receiving the textual description 106, the one or more AI models, after being trained, determine that the textual description 106 is similar to the textual descriptions received previously. Further, in the example, the one or more AI models identify, in an operation 714, that the context of the image 202 is to be generated based on Kratos instead of based on the virtual beach 116 or the term, beach, in the textual description 106. In the example, the context of the image 202 is identified based on the determination that in the predetermined number of the images one or more users are gazing at Kratos rather than at the virtual beaches around Kratos. Also, in the example, the one or more AI models identify, in an operation 716, that the context of the image 202 is to be generated based on the virtual beach 116 instead of Kratos. In the example, the context of the image 202 is identified based on the determination that in the preset number of the images one or more users are gazing at the virtual beaches rather than at Kratos.

In one embodiment, instead of or in addition to the HMD 702, another display device, such as a display device of a television or a display device of a computer, is used. In the embodiment, the gaze of the user 1 is captured by a camera that is situated in a real-world environment in which the user 1 is situated. For example, the gaze of the user 1 is captured by a camera that is on top of the other display device. In the example, the camera captures one or more images based on which the gaze of the user 1 is determined. In the example, the camera is coupled to the client device. The client device receives the images from the camera and sends the images via the computer network to the server system.

Figure 8:
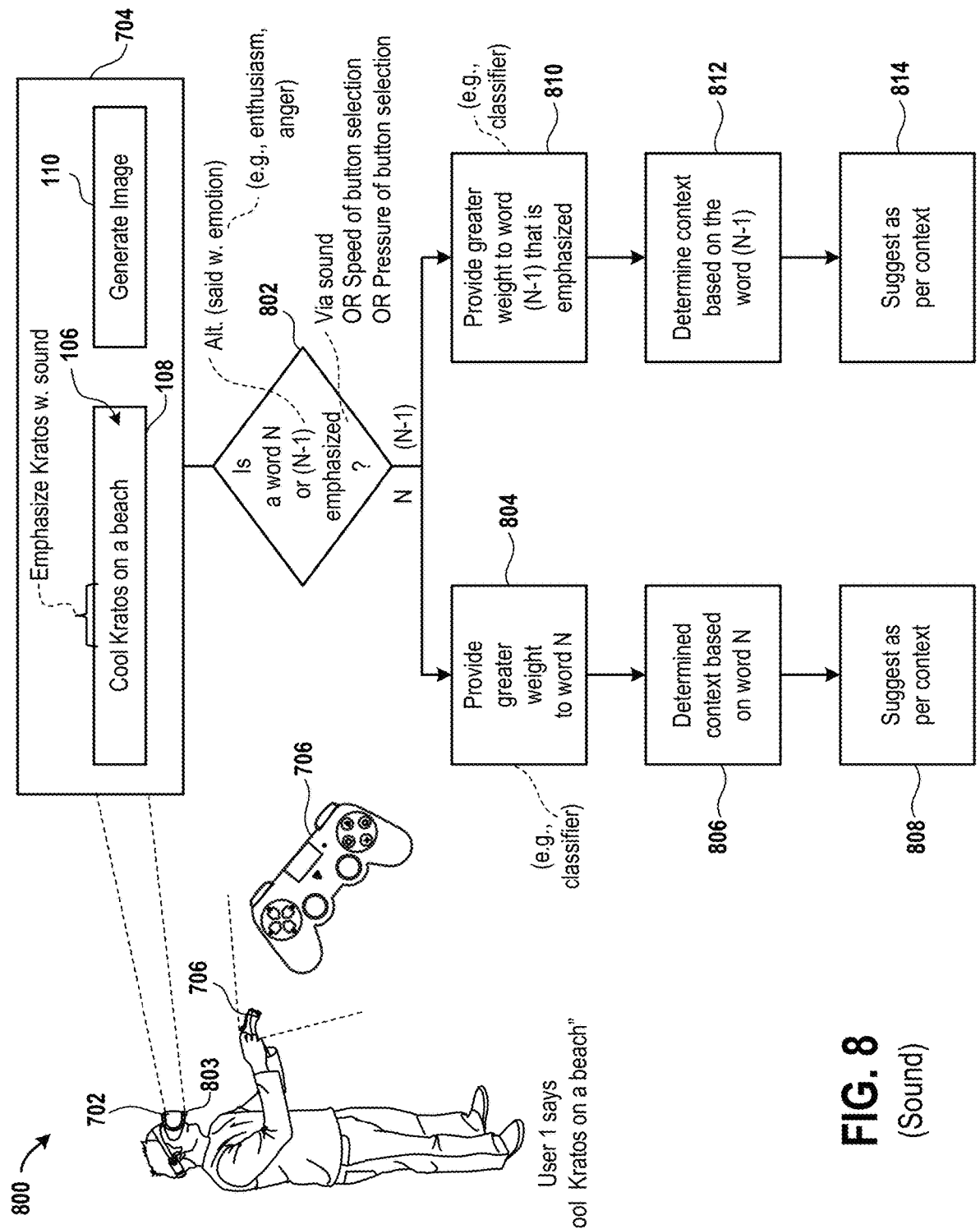
FIG. 8 is a diagram of an embodiment of a system to illustrate use of sound to determine a context of an image generated based on a textual description.

FIG. 8 is a diagram of an embodiment of a system 800 to illustrate use of sound to determine the context of the image, such as the image 202, generated based on the textual description 106 (FIG. 2). The system 800 includes the HMD 702. The HMD 702 includes one or more microphones, such as a microphone 803, that are directed towards a mouth of the user 1. The system 800 further includes the hand-held controller 706. Each of the one or more microphones is an example of the input device.

The user 1 uses the one or more microphones to utter the words 1 through N of the textual description 106 to provide the textual description 106 in the text field 108 displayed on the display screen 102. In addition, the user uses the hand-held controller 706 to select the generate image button 110 to generate a request for generating the image 202.

The one or more microphones of the HMD 702 capture audio data of the words 1 through N uttered by the user 1 to facilitate determination of which of the words 1 through N of the textual description 106 is emphasized by the user 1 and determination of the context of the image 202 based on the emphasized word. The hand-held controller 706 sends the indication of the selection of the generate image button 110 via the wireless link to the HMD 702. Upon receiving the indication of the selection, the processor of the HMD 702 obtains, from the one or more microphones, audio data of words 1 through N captured by the one or more microphones of the client device operated by the user 1, and controls the wireless circuit of the HMD 702 to send the audio data via the computer network to the server system in addition to sending the indication of the selection of the generate image button 110. The processor of the HMD 702 is coupled to the one or more microphones of the HMD 702.

The HMD 702 sends the audio data representing the words 1 through N, of the textual description 106, uttered by the user 1 with the indication of the selection of the generate image button 110 via the computer network to the server system. Upon receiving the audio data representing the words 1 through N with the indication of the selection of the generate image button 110, the one or more AI models, which are trained, determine the context based on which the image 202 is generated. The context of the image 202 is determined by the one or more AI models based on the audio data representing the words 1 through N received with the request for generating the image 202. For example, during or after receiving multiple textual descriptions, similar to the textual description 106 (FIG. 2), the one or more AI models send multiple suggestions, such as the suggestion 204 (FIG. 2), to multiple client devices operated by multiple users. In the example, the multiple suggestions are sent with multiple images, similar to the image 202, to the client devices. To illustrate, each of the multiple images have the same meaning or connotation or a combination thereof as that of the image 202 to be similar to the image 202. In the example, the suggestions provide contexts to the images.

In the example, the users use microphones of the client devices to provide audio data representing the textual descriptions, and the client devices send the audio data via the computer network to the server system. In the example, the one or more AI models of the server system analyze the audio data representing the textual descriptions to determine which word of each of the textual descriptions is emphasized the most compared to remaining words of each of the textual descriptions. To illustrate, the server system determines an amplitude or a frequency or a combination thereof of utterance by the users of each word of each of the textual descriptions to identify an emphasis provided to the word. In the illustration, the server system determines that the word of one of the textual descriptions is spoken with the highest amplitude or greatest frequency or a combination thereof, among all the words of the one of the textual descriptions and is therefore emphasized more compared to remaining words of the one of the textual descriptions. Further in the illustration, the server system determines that the word of the one of the textual descriptions is spoken with a higher amount of emotion, such as the amount of anger or enthusiasm, compared to the remaining words of the one of the textual descriptions upon determining that the amplitude or the frequency or a combination thereof of the audio data representing the word is greater than amplitudes of the audio data representing the remaining words.

Further, in the example, upon receiving the suggestions, the users use input devices to provide responses, such as acceptances or denials of the suggestions. In the example, the client devices send the responses via the computer network to the server system. Further in the example, upon receiving the responses, the one or more AI models are trained based on the responses. To illustrate, the one or more AI models are trained by receiving a predetermined number of the responses indicating the acceptances of the suggestions. As another illustration, the one or more AI models are trained by receiving a preset number of the responses indicating the denials of the suggestions.

In the example, the one or more AI models compare the textual descriptions of a predetermined number with the textual description 106 having the words 1 through N to determine whether the textual description 106 is similar to the textual descriptions of the predetermined number. Further, in the example, upon determining that the textual description 106 is similar to the textual descriptions of the predetermined number, the server system compares an amplitude with which each of the words 1 through N is uttered with an amplitude of each of the words of each of the textual descriptions of the predetermined number. Further, in the example, the server system determines that an amplitude of the word N is within a predetermined range from an amplitude of a similar word in each of the textual descriptions of the predetermined number to determine, in an operation 802, that the word N is emphasized in a similar manner compared to an emphasis provided to the similar word in each of the textual descriptions of the predetermined number. In the example, the similar word is similar, in meaning or connotation or a combination thereof, to the word N. In the example, the word N of the textual description 106 is emphasized in the similar manner to be emphasized the most among all the words 1 through N of the textual description 106.

In the example, upon determining that the word N is emphasized the most, the one or more AI models provide, in an operation 804, a greater weight to the word N compared to the remaining words 1 through (N−1) of the textual description 106. Further in the example, the one or more AI models determine, in an operation 806, a context of the image 202 based on the word N instead of the remaining words 1 through (N−1) of the textual description 106. To illustrate, the one or more AI models determine the context of the image 202 to be similar to the contexts of the images generated based on the textual descriptions of the predetermined number. To further illustrate, the one or more AI models determine the context of the image 202 to have the same meaning or connotation or a combination thereof as the contexts of the images generated based on the textual descriptions of the predetermined number. In the example, the one or more AI models output the image 202 having the context determined in the operation 806 and send the image 202 via the computer network to the client device operated by the user 1 for display on the display device 104 (FIG. 2).

Moreover, in the example, the one or more AI models generate in an operation 808, the suggestion 204 that is similar to the suggestions sent with the images of the predetermined number to the client devices. To illustrate, the suggestion 204 is similar to the suggestions sent with the images of the predetermined number when the suggestion 204 is similar to, such as has the same meaning or connotation or a combination thereof, the suggestions sent with the images of the predetermined number.

Further in the example, upon determining that the word (N−1) of the textual description 106 is emphasized instead of the word N in the operation 802, operations 810, 812, and 814 are performed by the one or more AI models with respect to the word (N−1) in the same manner in which the operations 804, 806, and 808 are performed by the one or more AI models with respect to the word N.

In one embodiment, instead of or in addition to the audio data, other input variables, such as speed of selections of buttons of the hand-held controller 706, or amounts of pressure applied to the buttons, or a combination thereof is used to determine amounts of emotions of the users. For example, the server system determines that a word of the one of multiple textual descriptions is provided with a higher amount of emotion, such as the amount of anger or enthusiasm, compared to the remaining words of the one of the textual descriptions upon determining that a speed of reception of selections of buttons of a hand-held controller of a client device from one of the users for providing the word is greater than speeds of receptions of selections of the buttons of the hand-held controller from the one of the users for providing the remaining words. In the example, a processor of the client device receives, from the buttons, signals indicating the speeds of selections of the buttons of the hand-held controller for providing the words of the one of the textual descriptions and sends the speeds via the computer network to the server system.

As another example, the server system determines that a word of the one of multiple textual descriptions is provided with a higher amount of emotion, such as the amount of anger or enthusiasm, compared to the remaining words of the one of the textual descriptions upon determining that amounts of pressure of selections or movements of buttons of a hand-held controller of a client device from one of the users for providing the word is greater than amounts of pressure of selections or movements of the buttons of the hand-held controller from the one of the users for providing the remaining words. In the example, a processor of the client device receives, from one or more pressure sensors coupled to the buttons, signals indicating the amounts of pressure of selections or movements of the buttons of the hand-held controller for providing the words of the one of the textual descriptions and sends the amounts of pressure via the computer network to the server system.

In an embodiment, one or more microphones are within the hand-held controller 706 instead of or in addition to the microphones of the HMD 702. The one or more microphone of the hand-held controller 706 capture the audio data captured by the microphones of the HMD 702.

Figure 9:
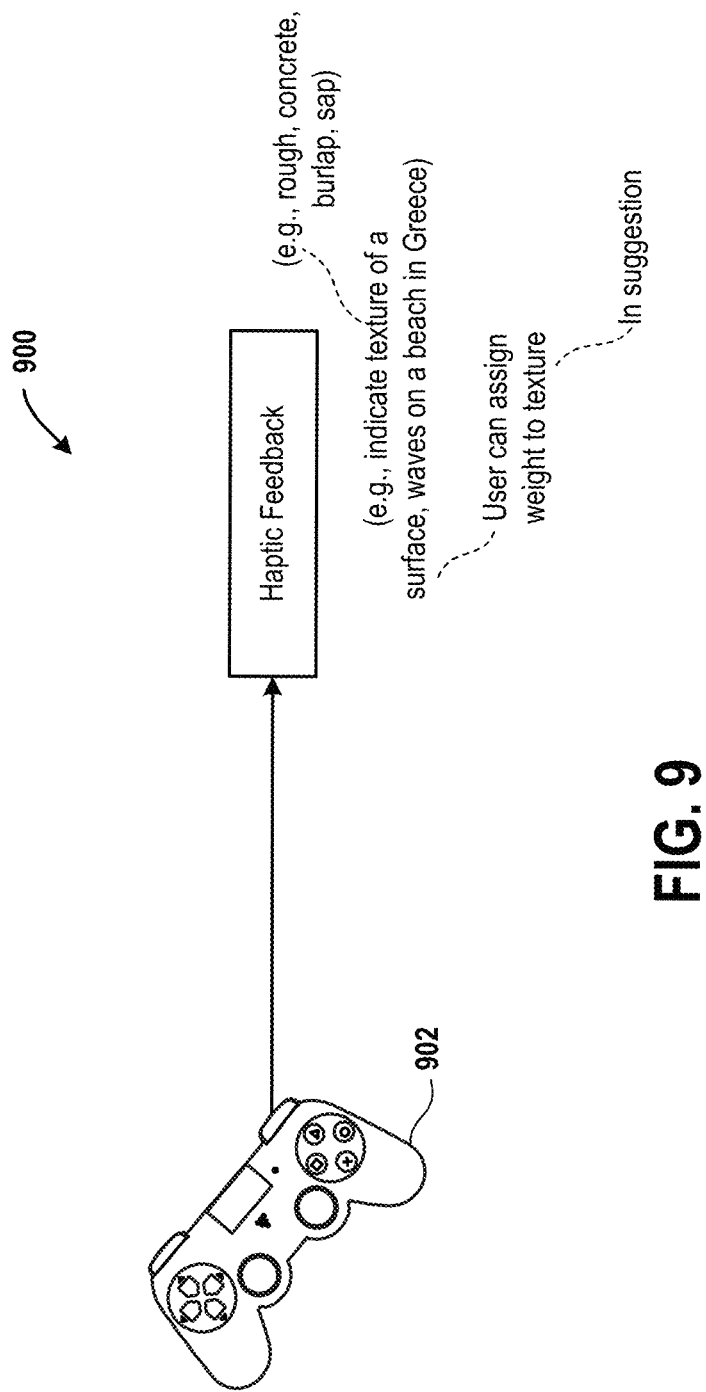
FIG. 9 is a diagram of an embodiment of a system illustrate that users can use a hand-held controller to receive feedback and assign weights to textures displayed in images generated based on textual descriptions.

FIG. 9 is a diagram of an embodiment of a system 900 to illustrate that users can use hand-held controllers, such as a hand-held controller 902, to assign weights to textures displayed in images generated based on textual descriptions. The system 900 includes the hand-held controller 902, which includes a haptic feedback system. An example of the haptic feedback system includes a processor, one or more drivers coupled to the processor, one or more motors coupled to the one or more drivers, and one or more portions of the hand-held controller 902 coupled to the one or more motors. To illustrate, each driver is a transistor. Also, as an illustration, the one or more portions of the hand-held controller 902 include one or more handles of the hand-held controller 902, one or more joysticks of the hand-held controller 902, and one or more buttons of the hand-held controller 902. As an example, a joystick is a button. The hand-held controller 706 (FIG. 7) is an example of the hand-held controller 902, and is used by any of the users.

The server system sends instructions regarding controlling the hand-held controller 902 based on suggestions sent from the server system via the computer network to the client devices. For example, upon determining, by the one or more AI models, that one of the suggestions to be provided in response to a textual description, such as a leather sofa, received from one of the client devices via the computer network is regarding a type of texture of material of an item, such as the leather sofa, displayed in an image, the server system generates the instructions indicating that the leather of the sofa is grained instead of smooth. In the example, the image is displayed on a display screen of the client device.

Also, in the example, upon receiving the instructions, the processor of the hand-held controller 902 sends control signals to the drivers of the hand-held controller 902. In the example, in response to the control signals, the drivers generate current signals that are sent to the motors of the hand-held controller 902. In the example, the motors move the buttons of the hand-held controller 902 in a manner to create up and down motions of the buttons, to illustrate that the texture of the leather sofa is grained and not smooth to provide haptic feedback to one of the users operating the hand-held controller 902. Further, in the example, the server system provides the one of the suggestions via the computer network to the client device for display of text of the one of the suggestions. In the example, upon viewing the text and receiving the haptic feedback, the one of the users selects one or more buttons on the hand-held controller 902 to indicate acceptance or denial of the text of the one of the suggestions.

As another example, upon determining, by the one or more AI models, that the suggestion 204 (FIG. 2) to be provided in response to the textual description 106 received from the client device operated by the user 1 via the computer network is regarding the beach in Greece, the server system generates the instructions indicating that a feel of the beach in Greece be generated. In the example, the image 202 is displayed on a display screen of the client device. Also, in the example, upon receiving the instructions, the processor of the hand-held controller 902 sends control signals to the drivers of the hand-held controller 902. In the example, in response to the control signals, the drivers generate current signals that are sent to the motors of the hand-held controller 902. In the example, the motors move the buttons of the hand-held controller 902 in a wavy manner to form waves to illustrate the beach in Greece.

Figure 10:
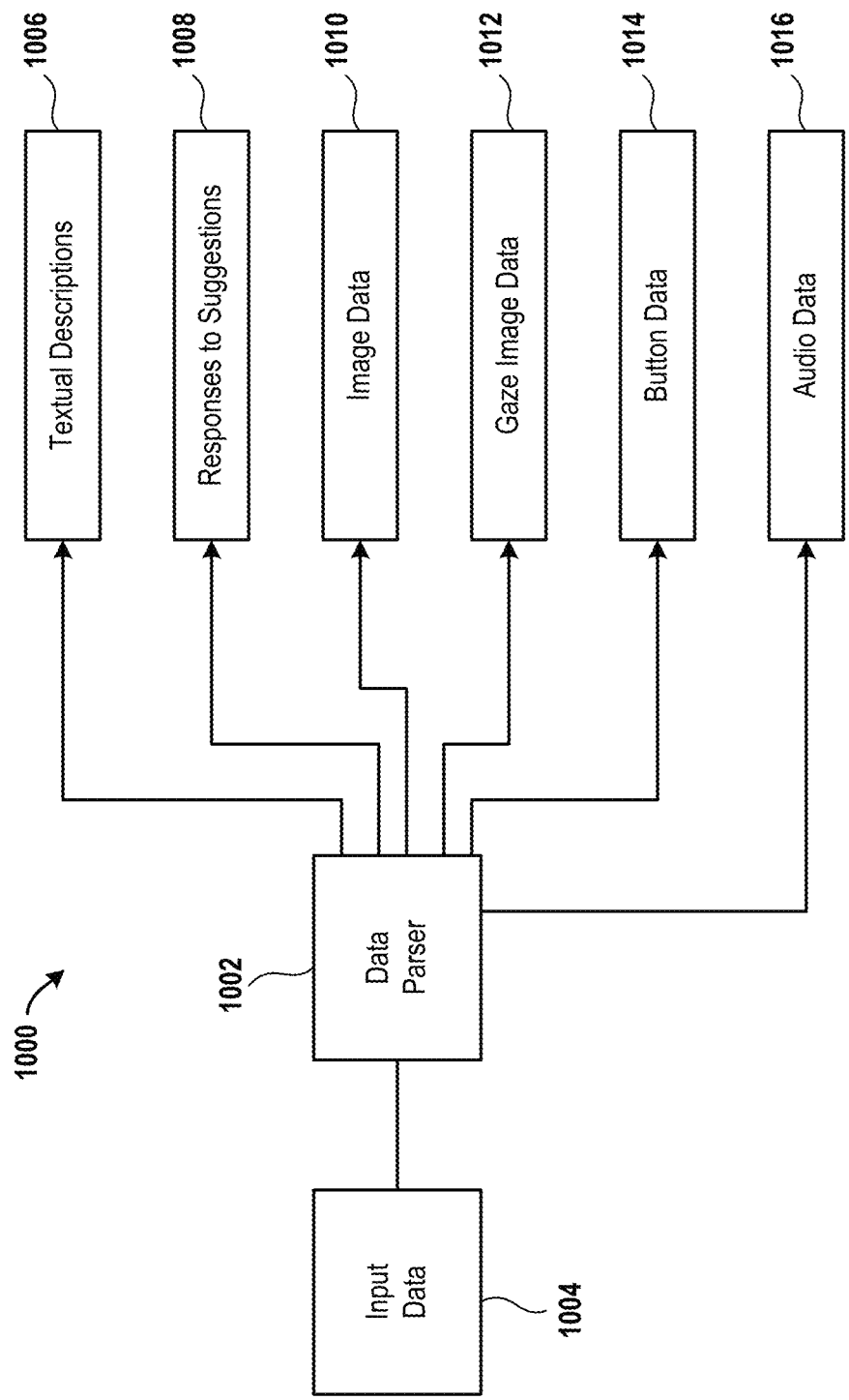
FIG. 10 is a diagram of an embodiment of a system to illustrate a data parser.

FIG. 10 is a diagram of an embodiment of a system 1000 to illustrate a data parser 1002. The system 1000 includes the data parser 1002. As an example, the data parser 1002 is implemented as hardware or software or a combination thereof within the server system. Examples of the hardware include an ASIC, a PLD, a CPU, a microprocessor, and a microcontroller. Examples of the software include a computer software program executable by the CPU or the microprocessor or the microcontroller.

The data parser 1002 is coupled to the client devices via the computer network. The system 1000 includes input data 1004, textual descriptions 1006, responses to suggestions 1008, image data 1010, gaze image data 1012, button data 1014, and audio data 1016. It should be noted that the responses to suggestions 1008 mean responses 1008 to suggestions, and the terms are used interchangeably herein. An example of the textual descriptions 1016 is the textual description 106 (FIG. 1) and other textual descriptions described herein. Examples of the responses to suggestions 1008 include the response indicating the acceptance or denial to the suggestion 204 (FIG. 2) and other responses received from one or more of the users in reply to other suggestions. To illustrate, the responses to suggestions 1008 includes textual descriptions, button data, audio data, or gaze image data, or a combination thereof. Examples of the image data 1010 is of images, such as the images 102 (FIG. 1) and 202 (FIG. 2), that are received to train the one or more AI models based on the textual descriptions 1006. To illustrate, some images of the image data 1010 are uploaded to the server system by the users via the client devices. To further illustrate, some of the images of the image data 1010 are accessed by the users via the client devices from the computer network or are created by the users or a combination thereof. As another illustration, some images of the image data 101 is created by the one or more AI models.

Examples of the gaze image data 1012 include images representing gazes of the users and received from one or more cameras of one or more of the client devices. Examples of the button data 1014 include data indicating selections or movements of buttons of the devices of the client devices, or amounts of pressures of the selections or the movements of the buttons, or directions of the movements of the buttons, or speeds of the movements or the selections of the buttons, or a combination thereof. Examples of the audio data 1016 include data describing sounds that are uttered by the users to provide one or more of the textual descriptions 1006.

The data parser 1002 receives the input data 1004 from the client devices via the computer network and parses the input data 1004 to identify the textual descriptions 1006, the responses to suggestions 1008, the image data 1010, the gaze image data 1012, the button data 1014, and the audio data 1016 from the input data 1004. For example, the data parser 1002 receives the input data 1004 and identifies text files from the input data 1004 to identify the textual descriptions 1006 as being stored within the text files.

Further in the example, the data parser 1002 determines that a response is in reply to a suggestion, such as the suggestion 204 (FIG. 2), upon determining that the response is received from one of the client devices via the computer network within a predetermined time interval from a time at which the suggestion is sent from the server system to the one of the client devices via the computer network. Also, in the example, the response includes an identification, such as alphanumeric characters, of the suggestion. In the example, when the server system sends the suggestion to the one of the client devices, the server system provides the identification to the data parser 1002. In the example, upon determining that the response is in reply to the suggestion and the response includes the identification, the data parser 1002 determines that the response is one of the responses 1008.

Continuing with the example, the data parser 1002 determines that each of one or more files received from the client devices via the computer network have an image file extension, such as Joint Photographic Experts Group (JPEG), or Graphics Interchange Format (GIF), or Portable Network Graphic (PNG), to determine that the image data 1010 or the gaze image data 1012 is received within the one or more files. The data parser 1002 receives the input data 1004 and identifies the image data 1010 from the input data 1004 by distinguishing the image data 1010 from the gaze image data 1012 (FIG. 10) of the input data 1004. To illustrate, the data parser 1002 determines that a portion of the input data 1004 that does not include images of eyes of users and that is not received from the cameras of the client devices is the image data 1010. In the example, the data parser 1002 determines that a portion of the input data 1004 that includes images of eyes of users and received from the cameras of the client devices is the gaze image data 1012. As another illustration, the data parser 1002 determines that a portion of the input data 1004 that is received with a selection of an upload button by one of the users on one of the client devices is the image data 1010 and not the gaze image data 1012.

In the example, the data parser 1002 determines that data received from the buttons of the input devices or sensors coupled to the buttons is the button data 1014. Further in the example, the data parser 1002 determines that data received from the microphones of the client devices and having audio file formats, such as MP4™, MP3™, and WAV, is the audio data 1016.

Figure 11A:
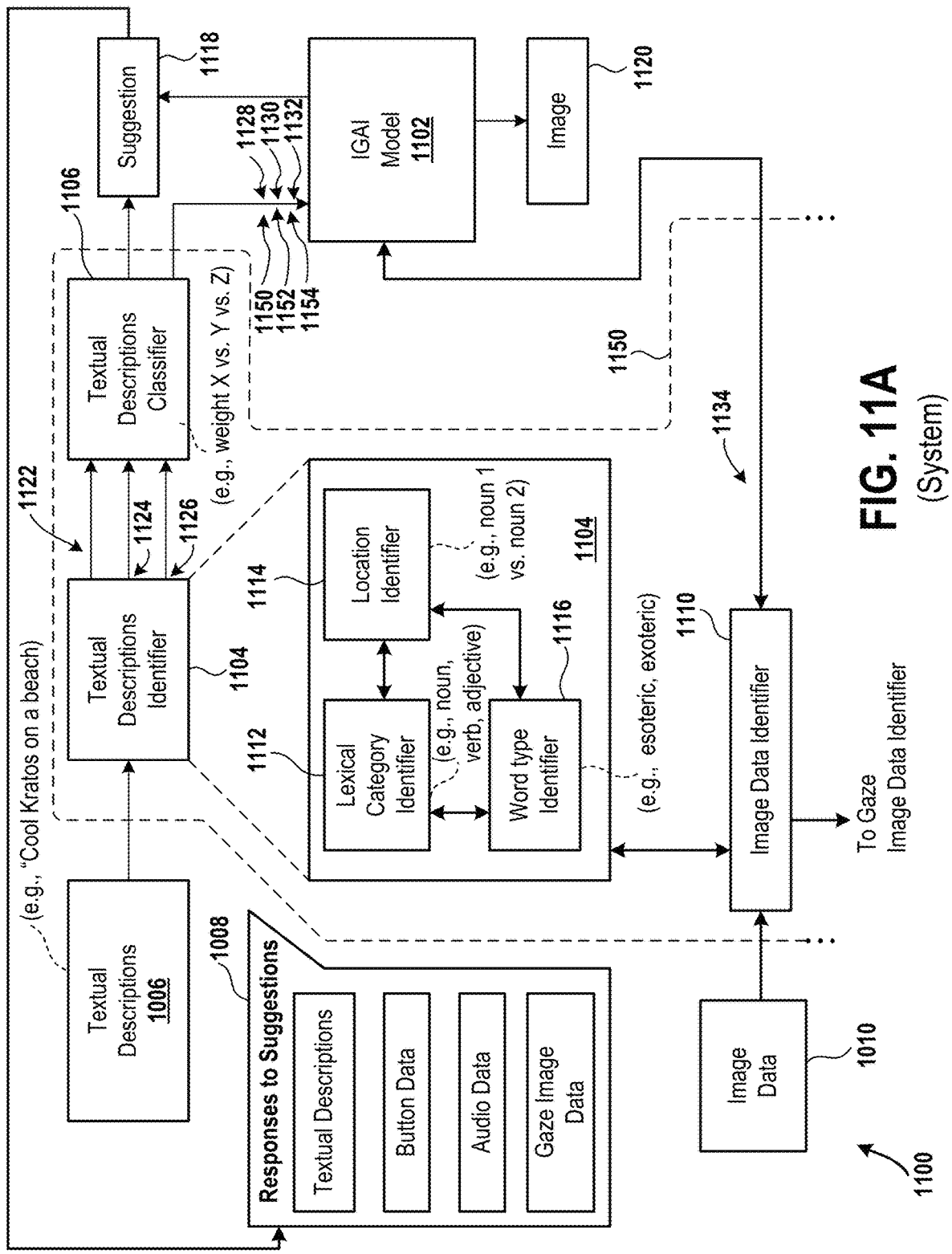
FIG. 11A is a diagram of an embodiment of a portion of a system to illustrate training of an image generation artificial intelligence (AI) model.

FIG. 11A is a diagram of an embodiment of a portion of a system 1100 to illustrate training of an image generation AI (IGAI) model 1102. The IGAI model 1102 is an example of the one or more AI models. The system 1100 includes a textual description identifier 1104, a textual description classifier 1106, an image data identifier 1110, and the IGAI model 1102. As an example, each of the textual description identifier 1104, the textual description classifier 1106, the image data identifier 1110, and the IGAI model 1102 is implemented as hardware or software or a combination thereof within the server system.

The textual description identifier 1104 includes a lexical category identifier 1112, a location identifier 1114, and a word type identifier 1116. As an example, each of the lexical category identifier 1112, the location identifier 1114, and the word type identifier 1116 is implemented as hardware or software or a combination thereof within the server system. The system 1100 further includes a suggestion 1118, such as the suggestion 204 (FIG. 2), and an image 1120, such as the image 202 (FIG. 2).

Each of the textual description identifier 1104 and the image data identifier 1110 is coupled to the data parser 1002 (FIG. 10). Also, the textual description identifier 1104 is coupled to the textual description classifier 1106, which is coupled to the IGAI model 1102. The image data identifier 1110 is coupled to the IGAI model 1102. The textual description identifier 1104 is coupled to the image data identifier 1110. The lexical category identifier 1112 is coupled to the location identifier 1114 and to the word type identifier 1116. The word type identifier 1116 is coupled to the location identifier 1114.

The textual description identifier 1104 receives the textual descriptions 1006, such as the textual description 106 (FIG. 1), from the client devices via the computer network and identifies words of the textual descriptions 1006. For example, the textual description identifier 1104 accesses an online dictionary to determine a meaning or a connotation or a combination thereof of each word of each of the textual descriptions 1006.

Moreover, upon identifying the words of the textual descriptions 1006, the lexical category identifier 1112 identifies one of the lexical categories of each of the words to output a lexical category output 1122. For example, the lexical category identifier 1112 accesses the online dictionary to determine whether each of the words of each of the textual descriptions 1006 falls into the first lexical category, the second lexical category, or the third lexical category. In the example, the online dictionary includes lexical categories of the words. Further in the example, a relationship between each of the words and a respective one of the lexical categories is an example of the lexical category output 1122.

Also, upon identifying the words of the textual descriptions 1006, the location identifier 1114 identifies the location of each of the words in each of the textual descriptions 1006 to output a location output 1124. For example, the location identifier 1114 identifies that the word (N−1) lies before the word N in the textual description 106 or that the word 2 comes after the word 1 in the textual description 106. In the example, locations of the words 1 through N in the textual description 106 is an example of the location output 1124. Further in the example, the locations of the words in each of the textual descriptions 1006 is an example of the location output 1124.

Moreover, upon identifying the words of the textual descriptions 1006, the word type identifier 1116 determines whether each of the words of each of the textual descriptions 1006 is esoteric or exoteric to output a word type output

1126. As an example, upon identifying the words of the textual descriptions 1006, the word type identifier 1116 sends requests to the client devices via the computer network to receive feedback from the users whether the words are esoteric or exoteric. In the example, in response to the requests, the users use the input devices to indicate whether each of the words of the textual descriptions 1006 is exoteric or esoteric. Further, in the example, the indications are received from the client devices via the computer network by the word type identifier 1116. Also in the example, the indications whether each of the words of the textual descriptions 1006 is esoteric or exoteric are examples of the word type output 1126.

As another example, upon identifying the words of the textual descriptions 1006, the word type identifier 1116 accesses multiple online dictionaries to identify meanings of the words of the textual descriptions 1006. Further in the example, the word type identifier 1116 determines, for each of the words of the textual descriptions 1006, whether a predetermined number, such as a majority, of the online dictionaries include meanings of the word. In the example, upon determining so, the word type identifier 1116 determines that the word is esoteric. Further in the example, upon determining that the predetermined number of the online dictionaries do not include the meanings of the word, the word type identifier 1116 determines that the word is exoteric. Also in the example, the indications whether each of the words of the textual descriptions 1006 is esoteric or exoteric are examples of the word type output 1126.

The textual description classifier 1106 receives the lexical category output 1122, the location output 1124, and the word type output 1126, and assigns weights, such as the weight X, Y, or Z, to each of the words of the textual descriptions 1006 based on one or more of the lexical category output 1122, the location output 1124, and the word type output 1126. For example, the textual description classifier 1106 receives the lexical category output 1122 and assigns weights to each of the words of the textual descriptions 1006 based on the lexical categories to output a category classified output 1128. To illustrate, upon determining that a first word of one of the textual descriptions 1006 is assigned the first lexical category, a second word of the one of the textual descriptions 1006 is assigned the second lexical category, and a third word of the one of the textual descriptions 1006 is assigned the third lexical category, the textual description classifier 1106 assigns the weight X to the first word, the weight Y to the second word, and the weight Z to the third word, where the weight X is greater than the weight Y and the weight Y is greater than the weight Z. In the illustration, a relationship between each of the weights, a respective one of the words of the textual descriptions 1006, and a respective one of the lexical categories of the respective one of the words is an example of the category classified output 1128. As another illustration, the textual description classifier 1106 sends requests to the client devices via the computer network to assign weights to each of the words of the textual descriptions 1006. In the illustration, each of the words falls into a respective one of the lexical categories. In the illustration, the users use input devices to assign the weights and the client devices send the weights via the computer network to the server system. In the illustration, a relationship between each of the weights, a respective one of the words of the textual descriptions 1006, and the respective one of the lexical categories of the respective one of the words is an example of the category classified output 1128.

As another example, the textual description classifier 1106 receives the lexical category output 1122 and the location output 1124, and assigns weights to each of the words of the textual descriptions 1006 based on the locations and the lexical categories of the words in each of the textual descriptions 1006 to output a location classified output 1130. To illustrate, upon determining that a first word of one of the textual descriptions 1006 is at a first predetermined location and has a predetermined lexical category, such as the first lexical category, and a second word of the one of the textual descriptions 1006 is at a second predetermined location and has the predetermined lexical category, the textual description classifier 1106 assigns the weight X to the first word and the weight Y to the second word, where the weight X is greater than the weight Y. In the illustration, a relationship between each of the weights, a respective one of the words of the textual descriptions 1006, a respective one of the lexical categories of the respective one of the words, and a respective one of the locations of the respective one of the words is an example of the location classified output 1130. As another illustration, the textual description classifier 1106 sends requests to the client devices via the computer network to assign weights to each of the words of the textual descriptions 1006. In the illustration, the users use input devices to assign the weights and the client devices send of the weights via the computer network to the server system. In the illustration, each of the words falls into a respective one of the lexical categories and also has a respective one of locations of the word in one of the textual descriptions 1006. In the illustration, a relationship between each of the weights, a respective one of the words of the textual descriptions 1006, the respective one of the lexical categories of the respective one of the words, and the respective one of the locations of the respective one of the words is an example of the location classified output 1130.

As yet another example, the textual description classifier 1106 receives the word type output 1126, and assigns weights to each of the words of the textual descriptions 1006 based on whether the word is esoteric or exoteric to output a word type classified output 1132. To illustrate, upon determining that a first word of one of the textual descriptions 1006 is esoteric and a second word of the one of the textual descriptions 1006 is exoteric, the textual description classifier 1106 assigns the weight X to the first word and the weight Y to the second word, where the weight X is greater than the weight Y. In the illustration, a relationship between each of the weights, a respective one of the words of the textual descriptions 1006, and an identification whether the respective one of the words is esoteric or exoteric is an example of the word type classified output 1132. As another illustration, the textual description classifier 1106 sends requests to the client devices via the computer network to assign weights to each of the words of the textual descriptions 1006. In the illustration, the users use input devices to assign the weights and the client devices send of the weights via the computer network to the server system. In the illustration, each of the words is either esoteric or exoteric. In the illustration, a relationship between each of the weights, a respective one of the words of the textual descriptions 1006, and the identities of the words as exoteric or esoteric is an example of the word type classified output 1132.

The image data identifier 1110 receives the image data 1010 from the data parser 1002, receives the textual descriptions 1006 identifying a portion of the image data 1010, and determines meaning or connotation or a combination thereof of the image data 1010 (FIG. 10) to output identified image data 1134. For example, the image data identifier 1110 determines that the portion of the image data 1010 of an image is received within a predetermined time period from a time of receipt of one of the textual descriptions 1006 describing the portion, and upon determining so, the image data identifier 1110 determines that the portion of the image data 1010 has the same meaning or connotation or a combination thereof as that of the one of the textual descriptions 1006. In the example, the image data identifier 1110 requests for and receives the time of receipt of one of the textual descriptions 1006 from the textual description identifier 1104. Moreover, in the example, the textual description identifier 1104 accesses a clock via the computer network to determine the time of receipt of the one of the textual descriptions 1006 from one of the client devices via the computer network. Further, in the example, the image data identifier 1110 includes a clock source to count the predetermined amount of time. Also in the example, the meaning or connotation or a combination thereof of the portion of image data 1010 and the portion of the image data 1010 are an example of the identified image data 1134.

Based on the category classified output 1128, the location classified output 1130, the word type classified output 1132, or a combination of two or more thereof, the IGAI model 1102 is trained to output the suggestion 1118 or the image 1120 or a combination thereof. For example, the IGAI model 1102 receives the textual description 106 (FIG. 1). In the example, upon receiving the textual description 106, the IGAI model 1102 determines that the textual description 106 is similar to a predetermined number of the textual descriptions 1006. Further, in the example, upon determining that the textual description 106 is similar to the predetermined number of the textual descriptions 1006, the IGAI model 1102 determines from the category classified output 1128, that in each of the predetermined number, such as a majority, of the textual descriptions 1006, a greater weight is assigned to one or more words of the first lexical category compared to weights assigned to one or more words of the second and third lexical categories. In the example, the one or more words of the first lexical category, the one or more words of the second lexical category, and the one or more words of the third lexical category are of each of the textual descriptions 1006. Also, in the example, upon determining that the greater weight is assigned, the IGAI model 1102 determines that the suggestion 1118 or the context of the image 1120 or a combination thereof is to be generated based on one or more words of the first lexical category of the textual description 106 that are similar to, such as having the same meaning or same connotation or a combination thereof, the one or more words of the first lexical category of the textual descriptions 1006 of the predetermined number and based on the identified image data 1134. To illustrate, the IGAI model 1102 determines that a preset number of the image data 1010 includes meanings of the context and accesses the preset number of the image data 1010 to generate the context of the image 1120. Also, in the illustration, the IGAI model 1102 determines that a predefined number of the textual descriptions 1006 includes words having meanings of the context and accesses the predefined number of the textual descriptions 1006 to generate the suggestion 1118. In the example, the server system sends the suggestion 1118 or the image 1120 having the context via the computer network to one of the client devices having the display device 104.

As another example, the IGAI model 1102 receives the textual description 106 (FIG. 1). In the example, upon receiving the textual description 106, the IGAI model 1102 determines that the textual description 106 is similar to a predetermined number of the textual descriptions 1006. Further, in the example, upon determining that the textual description 106 is similar to the predetermined number of the textual descriptions 1006, the IGAI model 1102 determines from the location output 1124, that in each of the predetermined number, such as a majority, of the textual descriptions 1006, a greater weight is assigned to a first word of one of the lexical categories, such as the first lexical category, compared to a weight assigned to a second word of the same one of the lexical categories, such as the first lexical category, and that the first word is located before the second word in each of the textual descriptions 1006 of the predetermined number. In the example, the first and second words are of each of the textual descriptions 1006 of the predetermined number. Also, in the example, upon determining that the greater weight is assigned, the IGAI model 1102 determines that the suggestion 1118 or the context of the image 1120 or a combination thereof is to be generated based on the first word of the textual description 106 that is similar, such as has the same meaning or the same connotation or a combination, to the first words of the textual descriptions 1006 of the predetermined number and based on the identified image data 1134. To illustrate, the IGAI model 1102 determines that a preset number of the image data 1010 includes meanings of the context and accesses the preset number of the image data 1010 to generate the context of the image 1120. Also, in the illustration, the IGAI model 1102 determines that a predefined number of the textual descriptions 1006 includes words having meanings of the context and accesses the predefined number of the textual descriptions 1006 to generate the suggestion 1118. In the example, the server system sends the suggestion 1118 or the image 1120 having the context via the computer network to one of the client devices having the display device 104.

As yet another example, the IGAI model 1102 receives the textual description 106 (FIG. 1). In the example, upon receiving the textual description 106, the IGAI model 1102 determines that the textual description 106 is similar to a predetermined number of the textual descriptions 1006. Further, in the example, upon determining that the textual description 106 is similar to the predetermined number of the textual descriptions 1006, the IGAI model 1102 determines from the word type classified output 1132, that in each of the predetermined number, such as a majority, of the textual descriptions 1006, a greater weight is assigned to an esoteric word compared to a weight assigned to an exoteric word. In the example, the esoteric and exoteric words are of each of the textual descriptions 1006. Also, in the example, upon determining that the greater weight is assigned, the IGAI model 1102 determines that the suggestion 1118 or the context of the image 1120 or a combination thereof is to be generated based on the esoteric word of the textual description 106 that is similar to, such as has the same meaning or connotation or a combination thereof, the esoteric word of the textual descriptions 1006 of the predetermined number and based on the identified image data 1134. To illustrate, the IGAI model 1102 determines that a preset number of the image data 1010 includes meanings of the context and accesses the preset number of the image data 1010 to generate the context of the image 1120. Also, in the illustration, the IGAI model 1102 determines that a predefined number of the textual descriptions 1006 includes words having meanings of the context and accesses the predefined number of the textual descriptions 1006 to generate the suggestion 1118. In the example, the server system sends the suggestion 1118 or the image 1120 having the context via the computer network to one of the client devices having the display device 104.

The server system sends the suggestion 1118 via the computer network to the client device from which the textual description 106 is received. Upon receiving the suggestion 1118, the user 1 provides the response to the suggestion 1118 via the computer network to the server system. The response is one of the responses 1008 (FIG. 10). The data parser 1002 (FIG. 10) receives the responses 1008 and parses and analyzes the responses 1008 in the same manner in which the input data 1004 (FIG. 10) is parsed and analyzed to identify textual descriptions, image data, button data, audio data, and gaze image data from the responses 1008.

The data parser 1002 sends the textual descriptions of the responses 1008 to the textual description identifier 1104, sends the image data of the responses 1008 to the image data identifier 1110, sends the button data of the responses 1008 to a button data identifier, sends the audio data of the responses 1008 to an audio data identifier, and sends the gaze image data of the responses 1008 to a gaze image data identifier. The button data identifier, the audio data identifier, and the gaze image data identifier are described below with reference to FIG. 11B. The textual description identifier 1104 analyzes the textual descriptions of the responses 1008 in the same manner in which the textual descriptions 1006 are analyzed. Also, the image data identifier 1110 analyzes the image data of the responses 1008 in the same manner in which the image data 1010 is analyzed, the button data identifier analyzes the button data of the responses 1008 in the same manner in which the button data 1014 is analyzed, the audio data identifier analyzes the audio data of the responses 1008 in the same manner in which the audio data 1016 is analyzed, and the gaze image data identifier analyzes the gaze image data of the responses 1008 in the same manner in which the gaze image data 1012 is analyzed.

In an embodiment, when requests are sent to the client devices to assign weights to each word of one of the textual descriptions 1006, one of the users operating one of the client devices, such as the tablet, provides the weights by highlighting the word. For example, the user uses one of the input devices to highlight, such as underline or circle, the word. In the example, the client device sends an indication that the word is highlighted and remaining words of the textual description are not via the computer network to the one or more AI models of the server system. Upon receiving the indication that the word is highlighted and the remaining words are not, the one or more AI models determine that the word is provided a greater weight compared to the remaining words.

In one embodiment, the text field 108 includes subfields for each word of one of the textual descriptions 1006. Each subfield includes portions and each portion has a pre-assigned weight. For example, each portion of the subfield displays the same word of the one of the textual descriptions 1006 in a different size, and each of the different sizes represents a different weight to be assigned to the word. One of the users uses one of the input devices to select one of the portions of the subsection to provide a weight to the word in the portion. The client device sends the weight via the computer network to the one or more AI models. The one or more AI models process the weight to modify image data of the image 102 (FIG. 1) to dynamically, such as in real time, generate image data of the image 202 (FIG. 2) based on the weight and sends the image data via the computer network to the client device for display of the image 202. As another example, one of the users one of the users uses one of the input devices to drag and drop words into a first database, such as a first word cloud, from a second database, such as a second word cloud, to provide weights to the words. For example, the user accesses the second word cloud having a group of words stored in the server system via one of the client devices and drags and drops one of the words into the one of the portions of the subsection of the first word cloud to provide a weight corresponding to the portion to the one of the words. The portions and the subsection are defined in the preceding example. The first word cloud is stored in the server system for access by the one of the client devices. The client device sends the weight via the computer network to the one or more AI models. The one or more AI models process the weight to modify image data of the image 102 (FIG. 1) to dynamically, such as in real time, generate image data of the image 202 (FIG. 2) based on the weight and sends the image data via the computer network to the client device for display of the image 202.

In an embodiment, one of the users uses one of the input devices to drag and drop words from a suggestion, such as the suggestion 204 (FIG. 2), to one of the textual descriptions 1006, such as the textual description 106, to add words to the one of the textual descriptions 1006.

Figure 11B:
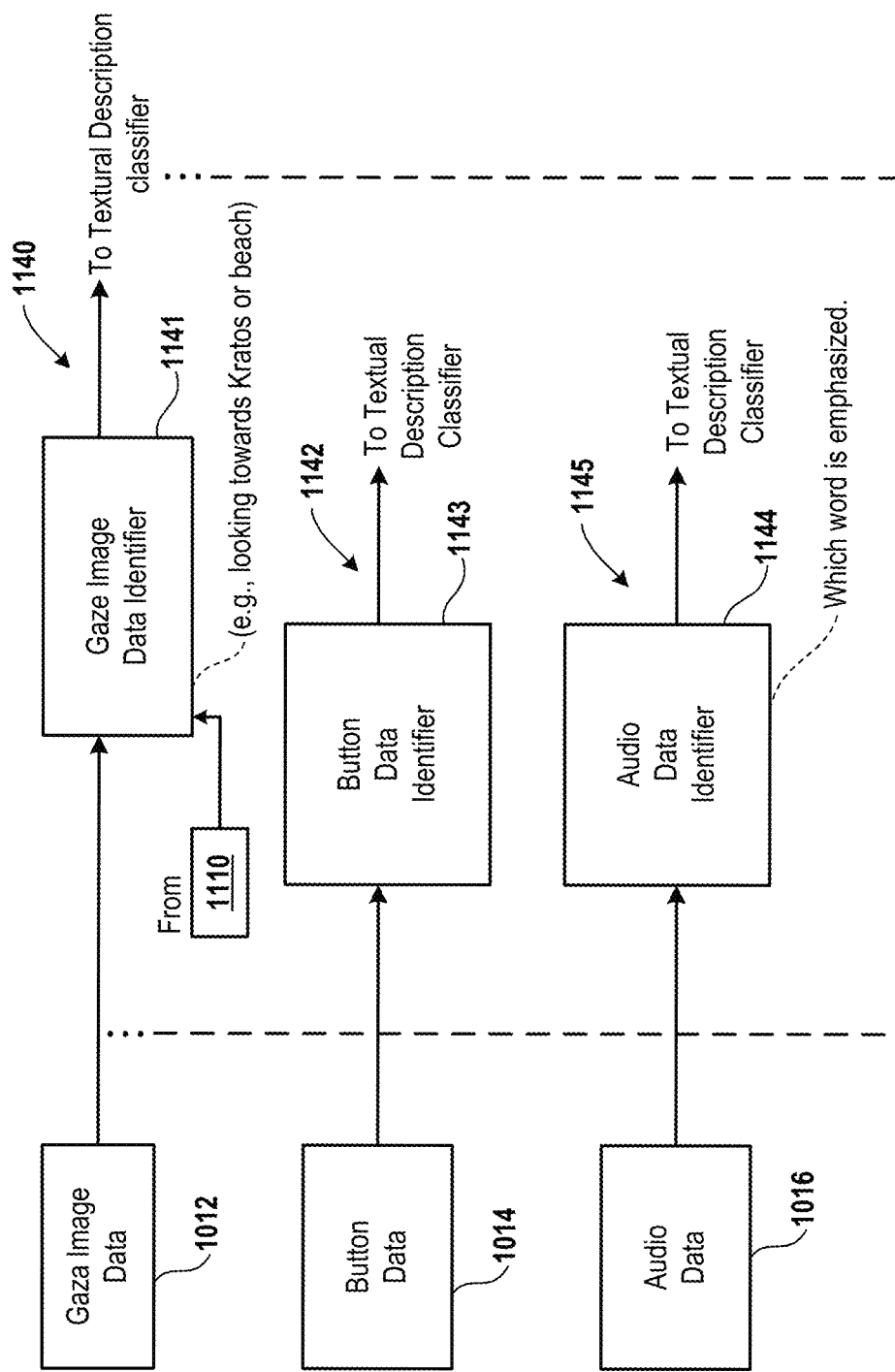
FIG. 11B is a diagram of an embodiment of the remaining portion of the system of FIG. 11A.

FIG. 11B is a diagram of an embodiment of the remaining portion of the system 1100. The system 1100 includes a gaze image data identifier 1141, a button data identifier 1143, and an audio data identifier 1145. As an example, each of the gaze image data identifier 1141, the button data identifier 1143, and the audio data identifier 1145 is implemented as hardware or software or a combination thereof within the server system. Moreover, each of the gaze image data identifier 1141, the button data identifier 1143, and the audio data identifier 1145 is coupled to the data parser 1002. Also, each of the gaze image data identifier 1141, the button data identifier 1143, and the audio data identifier 1145 is coupled to the textual description classifier 1106. It should be noted that the textual description identifier 1104 (FIG. 11A), the textual description classifier 1106 (FIG. 11A), the image data identifier 1110 (FIG. 11A), the gaze image data identifier 1141, the button data identifier 1143, and the audio data identifier 1145 are portions of an AI model 1150, which is one of the one or more AI models. The gaze image data identifier 1141 is coupled to the image data identifier 1110.

The gaze image data identifier 1141 receives the gaze image data 1012 from the data parser 1002 and the image data 1010 (FIG. 11A) from the image data identifier and determines directions of gazes of the users from the gaze image data 1012 to output identified gaze data 1140. The directions of gazes are towards one or more virtual objects in the image data 1010. For example, the gaze image data identifier 1141 parses the gaze image data 1012 to identify pixel data of a predetermined resolution range of eyes or of a predetermined shape of the eyes or a combination thereof. In the example, upon identifying the pixel data, the gaze image data identifier 1141 determines that eyes of a predetermined number of the users are directed towards a virtual character, similar to Kratos™, in the image data 1010 for a preset amount of time to determine that a predefined number of gazes of the users of the predetermined number are directed in a first direction towards the virtual character. In the example, on the other hand, upon identifying the pixel data, the gaze image data identifier 1141 determines that eyes of the predetermined number of the users are directed towards a virtual object, similar to the virtual beach 116, in the image data 1010 for the preset amount of time to determine that the predefined number of gazes of the users of the predetermined number are directed in a second direction towards the virtual object. In the example, the gaze image identifier 1102 includes a clock source or a timer to count whether the preset amount of time has passed. In the example, the first and second directions, the predetermined number of users, the preset amount of time, the predefined number of gazes, the virtual object, and the virtual character are examples of the output identified gaze data 1140. Examples of the one or more virtual objects in the image data 1110 include the virtual character 112 (FIG. 1), the virtual beach 116 (FIG. 1), the virtual ocean 114 (FIG. 1), the virtual sand 118 (FIG. 1), the virtual rocks 120 (FIG. 1), the virtual pants 122 (FIG. 1), the virtual covering 124 (FIG. 1), the virtual character 206 (FIG. 2), the virtual beach 218 (FIG. 2), the virtual beach shorts 208 (FIG. 2), the virtual ocean 210 (FIG. 2), the virtual stacks 212 of rocks (FIG. 2), the virtual Palm tree 214 (FIG. 2), and the virtual ocean 216 (FIG. 2).

The button data identifier 1143 receives the button data 1014 and identifies one or more buttons of one or more of the input devices selected by one or more of the users, and input parameters associated with the one or more buttons to output identified button data 1142. For example, the button data identifier 1102 identifies that a joystick of one of the input devices is moved in a direction with an amount of pressure, or identifies that a first set of buttons, such as an up button, of the input device is selected with a first set of amounts of pressure, or identifies that a second set of buttons, such as an R1 button, of the input device is selected with a second set of amounts of pressure, or identifies that the first set of buttons of the input device are selected or moved with a first set of speeds, or identifies that the second set of buttons of the input device are selected or moved with a second set of speeds. In the example, the identification that the joystick of the input device is moved in the direction with the amount of pressure, the identification that the first set of buttons are selected with the first set of amounts of pressure, the identification that the second set of buttons are selected with the second set of amounts of pressure, the identification that the first set of buttons are moved or selected with the first set of speeds, and the identification that second set of buttons are selected or moved with the second set of speeds are received from the input device via the computer network.

In the example, the button data identifier 1102 determines that the second set of amounts of pressure is greater than the first set of amounts of pressure and the first set of speeds is greater than the second set of speeds. Further in the example, the identification that the joystick of the input device is moved in the direction with the amount of pressure, the identification that the first set of buttons are selected with the first set of amounts of pressure, the identification that the second set of buttons are selected with the second set of amounts of pressure, the identification that the first set of buttons are moved or selected with the first set of speeds, the identification that second set of buttons are selected or moved with the second set of speeds, the determination that the first set of speeds is greater than the second set of speeds, and the determination that the first set of amounts of pressure is greater than the second set of amounts of pressure are an example of the identified button data 1142. Examples of the input parameters include an amount of pressure applied to a button of one of the input devices, a selection of the button, a non-selection of the button, a direction of movement of the button, and a speed of selections of multiple buttons of the one of input devices.

Also, the audio data identifier 1145 receives the audio data 1016 and determines audio parameters, such as frequencies and amplitudes, of each word of the audio data 1016 to output identified audio data 1144. For example, the audio data identifier 1145 applies fast Fourier transform to convert the audio data 1016 from a time domain to the frequency domain to determine a frequency of utterance each word of the audio data 1016. Moreover, in the example, the audio data identifier 1145 identifies an amplitude of utterance of each word of the audio data 1016. In the example, the amplitudes are received within the audio data 1016 from the client devices via the computer network. In the example, the higher the frequency or the amplitude or a combination thereof of a word, the greater the emphasis of the word. Further in the example, the amplitudes or the frequencies or a combination thereof are examples of the identified audio data 1144.

The identified gaze data 1140 is sent from the gaze image data identifier 1141 to the textual description classifier 1106. Also, the identified button data 1142 is sent from the button data identifier 1143 to the textual description classifier 1106 and the identified audio data 1144 is sent from the audio data identifier 1145 to the textual description classifier 1106.

The textual description classifier 1106 receives the identified gaze data 1140, the identified button data 1142, and the identified audio data 1144, and assigns weights, such as the weight X, Y, or Z, to each of the words of the textual descriptions 1006 based on one or more of the lexical category output 1122 (FIG. 11A), the location output 1124 (FIG. 11A), the word type output 1126 (FIG. 11A), the identified gaze data 1140, the identified button data 1142, and the identified audio data 1144. For example, the textual description classifier 1106 receives the identified gaze data 1140 and assigns weights to each of the words of the textual descriptions 1006 based on the directions of gazes within the identified gaze data 1140 to output a gaze classified output 1150. To illustrate, upon determining that the first direction of gaze of the user 1 is towards the virtual character 112 (FIG. 1), such as Kratos™, rather than the second direction of gaze of the user 1 towards the virtual beach 116 (FIG. 1) in the image 102 (FIG. 1) that is generated based on the textual description 106, the textual description classifier 1106 assigns the weight X to the word Kratos™ in the textual description 106 and the weight Y to the word beach in the textual description 106, where the weight X is greater than the weight Y. In the illustration, a relationship between each of the first and second directions of gaze and the weights X and Y assigned to the words Kratos™ and beach is an example of the gaze classified output 1150.

As another example, the textual description classifier 1106 receives the identified button data 1142, and assigns weights to each of the words of the textual descriptions 1006 based on speeds of selections of one or more buttons of one or more of the input devices, or speeds of movements of the one or more buttons, or pressures applied to the buttons or a combination thereof to output a button classified output 1152. To illustrate, upon determining that the first set of buttons of one of the client devices is selected at the first set of speeds to type the word, Kratos™, and the first set of speeds is greater than the second set of speeds to select the second set of buttons of the client device to provide the word, beach, in the textual description 106, the textual description classifier 1106 assigns the weight X to the word, Kratos™, and the weight Y to the word, beach, where the weight X is greater than the weight Y. In the illustration, a relationship between each of the weights, the words Kratos™ and beach of the textual description 106, and the first and second sets of speeds is an example of the button classified output 1152. As another illustration, upon determining that the first set of buttons of one of the client devices is selected with the first set of amounts of pressure to type the word, Kratos™, and the first set of amounts of pressure is greater than the second set of amounts of pressure to select the second set of buttons of the one of the client devices to provide the word, beach, in the textual description 106, the textual description classifier 1106 assigns the weight X to the word. Kratos™, and the weight Y to the word, beach, where the weight X is greater than the weight Y. In the illustration, the first set of amounts of pressure is greater than the second set of amounts of pressure. In the illustration, a relationship between each of the weights, the words Kratos™ and beach of the textual description 106, and the first and second sets of amounts of pressure is an example of the button classified output 1152.

As yet another example, the textual description classifier 1106 receives the identified audio data 1144, and assigns weights to each of the words of the textual descriptions 1006 based on amount of emphasis on words of the identified audio data 1144 to output an audio classified output 1154. To illustrate, upon determining, based on the identified audio data 1144, that a first word of the textual description 106 is spoken by one of the users with a first amount of emphasis than a second amount of emphasis placed on a second word of the textual description 106, the textual description classifier 1106 assigns the weight X to the first word and the weight Y to the second word, where the weight X is greater than the weight Y. In the illustration, a relationship between each of the weights, a respective one of the words of the textual description 106, and the first or second amount of emphasis of the respective one of the words is an example of the audio classified output 1154.

Based on the category classified output 1128, or the location classified output 1130, or the word type classified output 1132, or the gaze classified output 1150, or the button classified output 1152, or the audio classified output 1154, or a combination of two or more thereof, the IGAI model 1102 is trained to output the suggestion 1118 or the image 1120 or a combination thereof. For example, the IGAI model 1102 receives the textual description 106 (FIG. 1). In the example, upon receiving the textual description 106, the IGAI model 1102 determines that the textual description 106 is similar to, such as has the same meaning or the same connotation or a combination thereof as that of, a predetermined number of the textual descriptions 1006. Further, in the example, upon determining that the textual description 106 is similar to the predetermined number of the textual descriptions 1006, the IGAI model 1102 determines from the gaze classified output 1150, that in each of the predetermined number, such as a majority, of the textual descriptions 1006, a greater weight is assigned to the word Kratos™ based on the first gaze direction towards virtual characters, similar to the virtual character 112 (FIG. 1), in images, such as the image 102, of the predetermined number compared to a weight assigned to the word beach based on the second gaze direction towards virtual beaches, such as the virtual beach 116, in the images of the predetermined number. In the example, the images of the predetermined number are generated by the server system based on the textual descriptions 1006 of the predetermined number. In the example, virtual characters are similar to each other when they have the same meaning or same connotation or a combination thereof. Also, in the example, the virtual beaches are similar to each other when they have the same meaning or same connotation or a combination thereof. Also, in the example, upon determining that the greater weight is assigned, the IGAI model 1102 determines that the suggestion 1118 or the context of the image 1120 or a combination thereof is to be generated based on the word, such as Kratos™, in the textual description 106 that is similar to Kratos™ or Cratos or Cratus™ or Karatos in the textual descriptions 1006 of the predetermined number and based on the identified image data 1134 rather than based on the word beach of the textual description 106. To illustrate, the IGAI model 1102 determines that a preset number of the image data 1010 have meanings of the context and accesses the preset number of the image data 1010 to generate the context of the image 1120. Also, in the illustration, the IGAI model 1102 determines that a predefined number of the textual descriptions 1006 includes words having meanings of the context and accesses the predefined number of the textual descriptions 1006 to generate the suggestion 1118. In the example, the server system sends the suggestion 1118 or the image 1120 having the context via the computer network to one of the client devices having the display device 104.

As another example, the IGAI model 1102 receives the textual description 106 (FIG. 1). In the example, upon receiving the textual description 106, the IGAI model 1102 determines that the textual description 106 is similar to a predetermined number of the textual descriptions 1006. Further, in the example, upon determining that the textual description 106 is similar to the predetermined number of the textual descriptions 1006, the IGAI model 1102 determines from the button classified output 1152, that in each of the predetermined number, such as a majority, of the textual descriptions 1006, a greater weight is assigned to the word Kratos™ based on the first set of speeds or the first set of amounts of pressure or a combination thereof compared to a weight assigned to the word beach based on the second set of speeds or the second set of amounts of pressure or a combination thereof. Also, in the example, upon determining that the greater weight is assigned, the IGAI model 1102 determines that the suggestion 1118 or the context of the image 1120 or a combination thereof is to be generated based on the word Kratos™ in the textual description 106 that is similar to the word Kratos™ or Crator or Cratus™ or Karatos in the textual descriptions 1006 of the predetermined number and based on the identified image data 1134 rather than based on the word beach in the textual description 106. To illustrate, the IGAI model 1102 determines that a preset number of the image data 1010 have meanings of the context and accesses the preset number of the image data 1010 to generate the context of the image 1120. Also, in the illustration, the IGAI model 1102 determines that a predefined number of the textual descriptions 1006 includes words having meanings of the context and accesses the predefined number of the textual descriptions 1006 to generate the suggestion 1118. In the example, the server system sends the suggestion 1118 or the image 1120 having the context via the computer network to one of the client devices having the display device 104.

As yet another example, the IGAI model 1102 receives the textual description 106 (FIG. 1). In the example, upon receiving the textual description 106, the IGAI model 1102 determines that the textual description 106 is similar to a predetermined number of the textual descriptions 1006. Further, in the example, upon determining that the textual description 106 is similar to the predetermined number of the textual descriptions 1006, the IGAI model 1102 determines from the audio classified output 1154, that in each of the predetermined number, such as a majority, of the textual descriptions 1006, a greater weight is assigned to the word Kratos™ based on the first amount of emphasis compared to a weight assigned to the word beach based on the second amount of emphasis. In the example, the first amount is greater than the second amount. Also, in the example, upon determining that the greater weight is assigned, the IGAI model 1102 determines that the suggestion 1118 or the context of the image 1120 or a combination thereof is to be generated based on the word Kratos™ in the textual description 106 that is similar to the word Kratos™ or Cratos or Karatos in the textual descriptions 1006 of the predetermined number and based on the identified image data 1134 rather than based on the word beach in the textual description 106. To illustrate, the IGAI model 1102 determines that a preset number of the image data 1010 have meanings of the context and accesses the preset number of the image data 1010 to generate the context of the image 1120. Also, in the illustration, the IGAI model 1102 determines that a predefined number of the textual descriptions 1006 includes words having meanings of the context and accesses the predefined number of the textual descriptions 1006 to generate the suggestion 1118. In the example, the server system sends the suggestion 1118 or the image 1120 having the context via the computer network to one of the client devices having the display device 104.

In one embodiment, the textual description identifier 1104, the textual description classifier 1106, the image data identifier 1110, the gaze image data identifier 1141, the button data identifier 1143, and the audio data identifier 1145 are parts of the IGAI model 1102.

Figure 12:
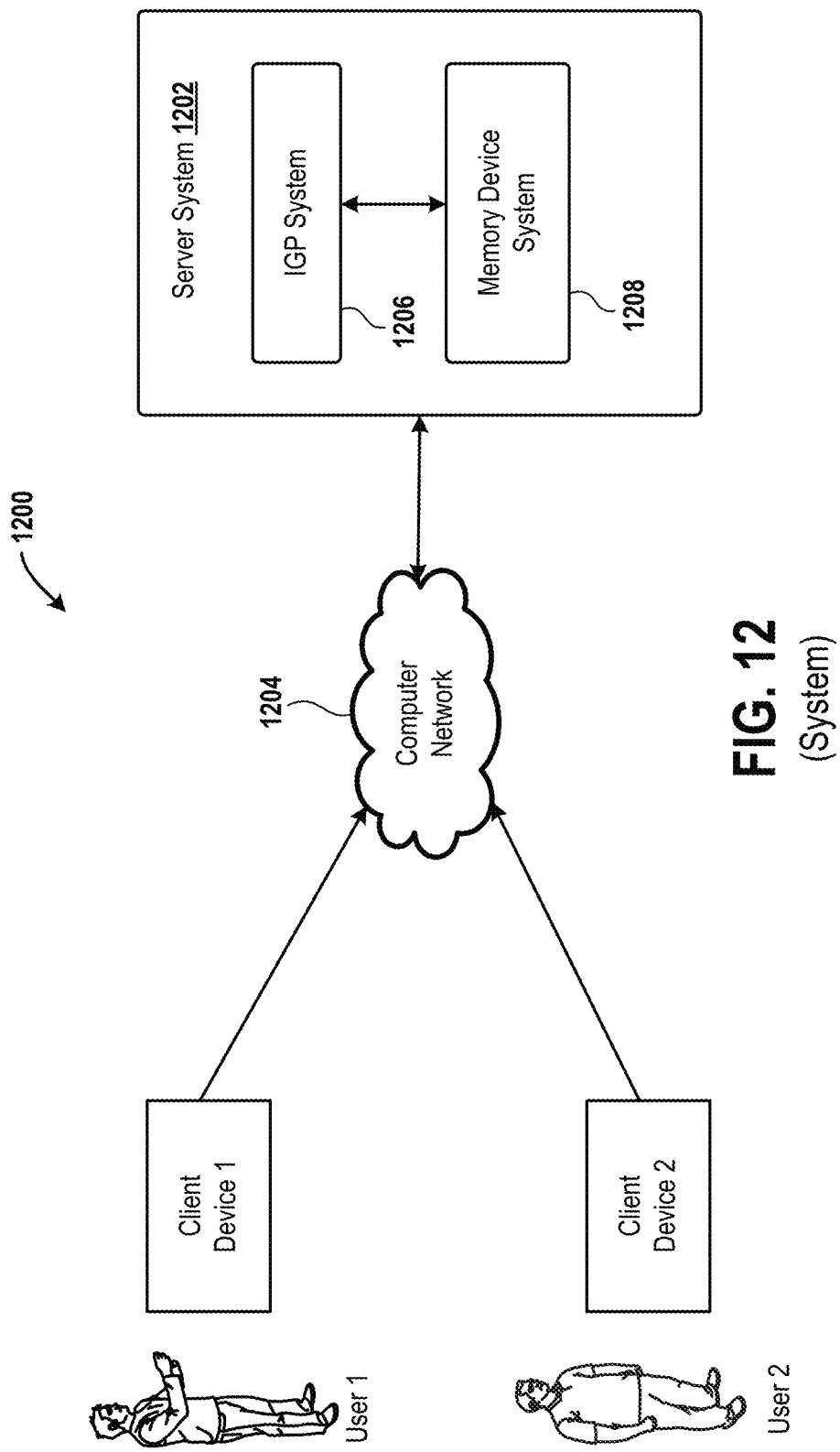
FIG. 12 is a diagram of an embodiment of a system to illustrate use of client devices by users with a server system.

FIG. 12 is a diagram of an embodiment of a system 1200 to illustrate use of client devices 1 and 2 by the user 1 and a user 2 with a server system 1202. The system 1200 includes the client devices 1 and 2, a computer network 1204, and the server system 1202. The server system 1202 includes one or more servers, an example of which is illustrated below in FIG. 14. Each server includes one or more processors and one or more memory devices. The one or more processors are coupled to the one or more memory devices. An example of a processor, as used herein, is a CPU or a microcontroller or a microprocessor. Examples of a memory device, as used herein, include a read-only memory (ROM) and a random access memory (RAM).

The server system 1202 includes an image generation processor (IGP) system 1206 and a memory device system 1208. The IGP system 1206 includes one or more processors and the memory device system 1208 includes one or more memory devices. The IGP system 1206 is coupled to the memory device system 1208. The one or more processors of the IGP system 1206 execute the one or more AI models.

Figure 13A:
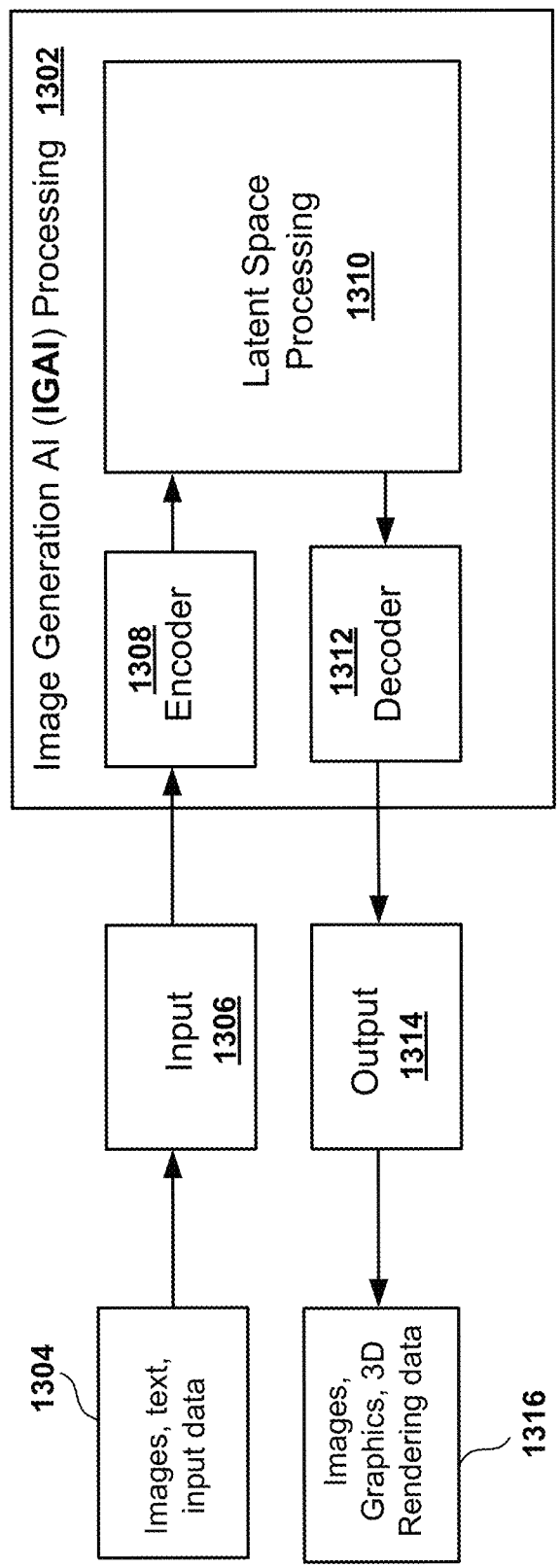
FIG. 13A is an embodiment of a general representation of a processing sequence of an IGAI model.

FIG. 13A is a general representation of a processing sequence of an IGAI model 1302, in accordance with one embodiment. The IGAI model 1102 (FIG. 11A) is an example of the IGAI model 1302. As shown, an input 1306 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 1306 is configured to convey the intent of a user, described herein, that wishes to utilize the IGAI model 1302 to generate some digital content. In the context of game technology, the target content to be generated can be a game asset for use in a specific game scene. In such a scenario, the data set used to train the IGAI model 1302 and the input 1306 is used to customize the way artificial intelligence, e.g., deep neural networks process the data to steer and tune the desired output image, data or three-dimensional digital asset.

The input 1306 is then passed to the IGAI model 1302, where an encoder 1308 takes input data and/or pixel space data and coverts into latent space data. The concept of "latent space" is at the core of deep learning, since feature data is reduced to simplified data representations for the purpose of finding patterns and using the patterns. The latent space processing 1310 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI model 1302. In latent space processing 1310, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 1312 then transforms a resulting output from the latent space back to the pixel space. The output 1314 may then be processed to improve the resolution. The output 1314 is then passed out as the result, which may be an image, graphics, 3D data, or data that can be rendered to a physical form or digital form.

Figure 13B:
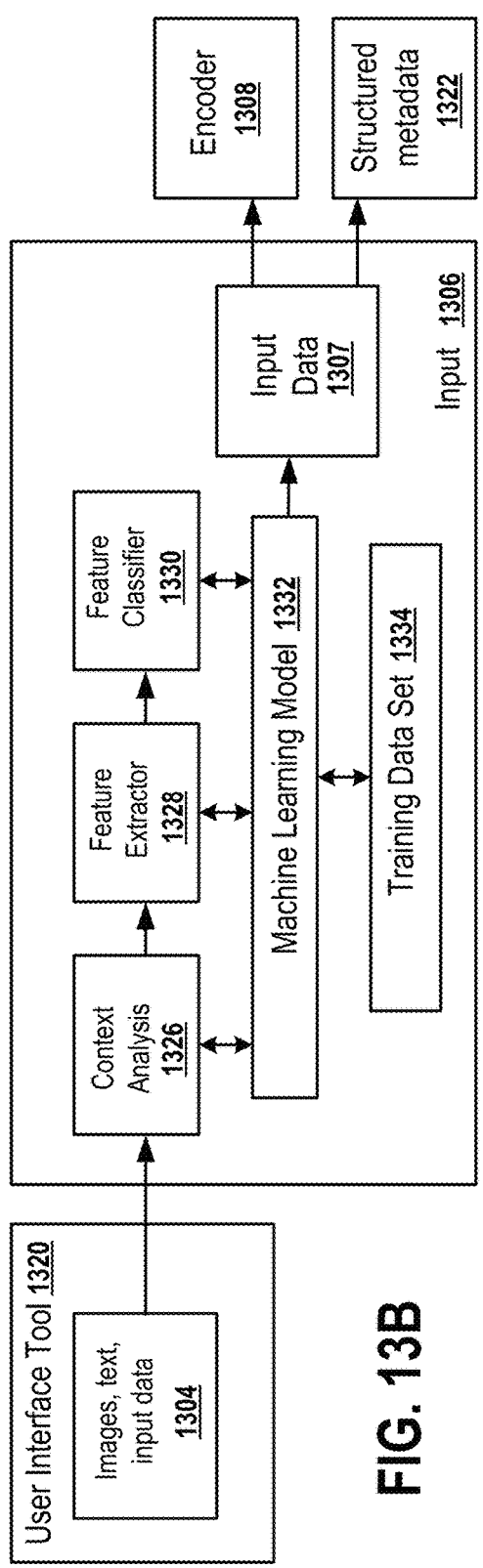
FIG. 13B illustrates, in one embodiment, additional processing that is applied to an input of the IGAI model of FIG. 13A.

FIG. 13B illustrates, in one embodiment, additional processing that may be done to the input 1306. A user interface tool 1320 may be used to enable the user to provide an input request 1304. The input request 1304, as discussed above, may be images, text, structured text, or generally data. The input data 1004 (FIG. 10) is an example of the input request 1304. In one embodiment, before the input request is provided to the encoder 1308, the input can be processed by a machine learning process that generates a machine learning model 1332, and learns from a training data set 1334. The machine learning model 1332 is an example of the one or more AI models. By way of example, the input data is processed to via a context analyzer 1326 to understand the context of the request. For example, if the input is "space rockets for flying to the mars", the input is analyzed by the context analyzer 1326 to determine that the context is related to outer space and planets. The context analysis uses machine learning model 1332 and training data set 1334 to find related images for this context or identify specific libraries of art, images or video. If the input request also includes an image of a rocket, the feature extractor 1328 functions to automatically identify feature characteristics in the rocket image, e.g., fuel tank, length, color, position, edges, lettering, flames, etc. A feature classifier 1330 is used to classify the features and improve the machine learning model 1332. In one embodiment, the input data 1307 is generated to produce structured information that can be encoded by encoder 1308 into the latent space. Additionally, it is possible to extract out structured metadata 1322 from the input request. The structured metadata 1322 may be, for example, descriptive text used to instruct the IGAI model 1302 to make a modification to a characteristic or change to the input images or changes to colors, textures, or combinations thereof. For example, the input request 1304 could include an image of the rocket, and the text can say "make the rocket wider" or "add more flames" or "make it stronger" or some of other modifier intended by the user (e.g., semantically provided and context analyzed). The structured metadata 1322 is then used in subsequent latent space processing to tune the output to move toward the user's intent. In one embodiment, the structured metadata is in the form of semantic maps, text, images, or data that is engineered to represent the user's intent as to what changes or modifications are to be made to an input image or content.

Figure 13C:
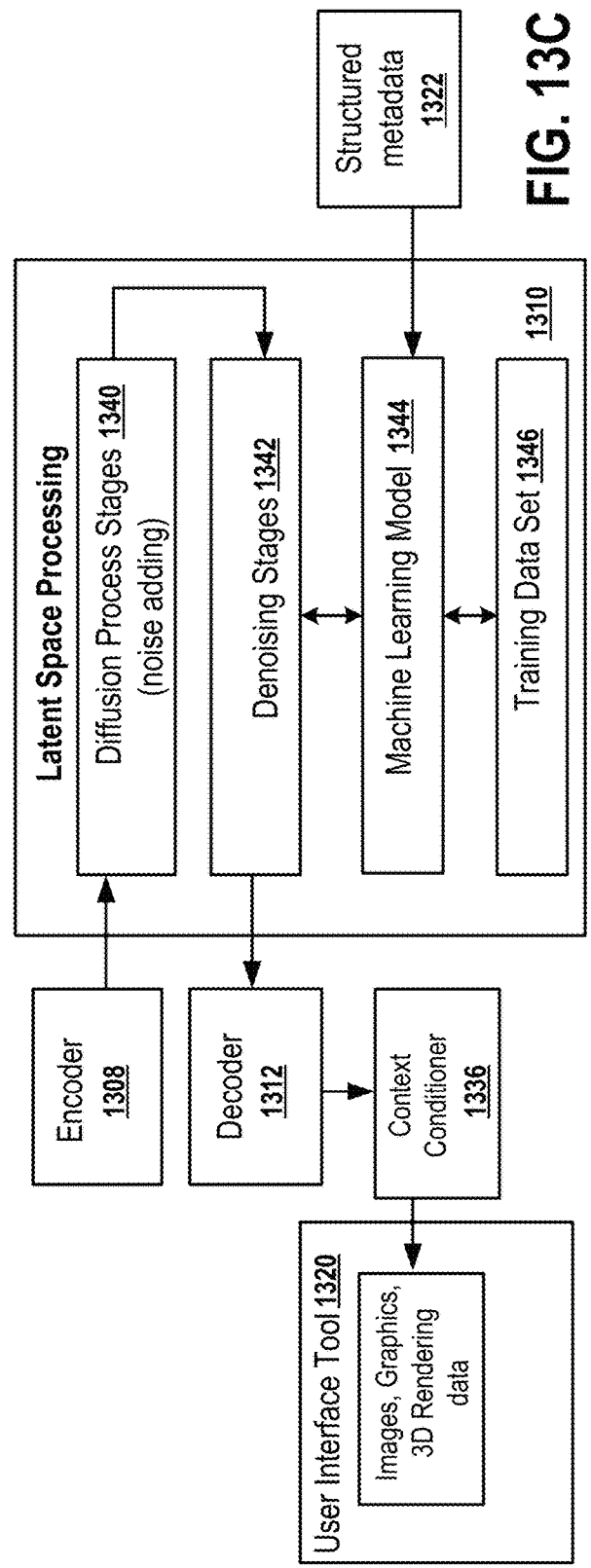
FIG. 13C illustrates how an output of an encoder is fed into a latent space processing, in accordance with one embodiment

FIG. 13C illustrates how the output of the encoder 1308 is then fed into latent space processing 1310, in accordance with one embodiment. A diffusion process is executed by diffusion process stages 1340, wherein the input is processed through a number of stages to add noise to the input image or images associated with the input text. This is a progressive process, where at each stage, e.g., 10-50 or more stages, noise is added. Next, a denoising process is executed through denoising stages 1342. Similar to the noise stages, a reverse process is executed where noise is removed progressively at each stage, and at each stage, machine learning is used to predict what the output image or content should be, in light of the input request intent. In one embodiment, the structured metadata 1322 is used by a machine learning model 1344 at each stage of denoising, to predict how the resulting denoised image should look and how it should be modified. The machine learning model 1344 is an example of the one or more AI models. During these predictions, the machine learning model 1344 uses the training data set 1346 and the structured metadata 1322, to move closer and closer to an output that most resembles the requested in the input. In one embodiment, during the denoising, a U-Net architecture that has cross-attention layers may be used, to improve the predictions. After the final denoising stage, the output is provided to the decoder 1312 that transforms that output to the pixel space. In one embodiment, the output is also upscaled to improve the resolution. The output of the decoder 1312, in one embodiment, can be optionally run through a context conditioner 1336. The context conditioner 1336 is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 1344 gets smarter with more training over time, there will be less need for a context conditioner 1336 before the output is rendered in the user interface tool 1320.

Figure 14:
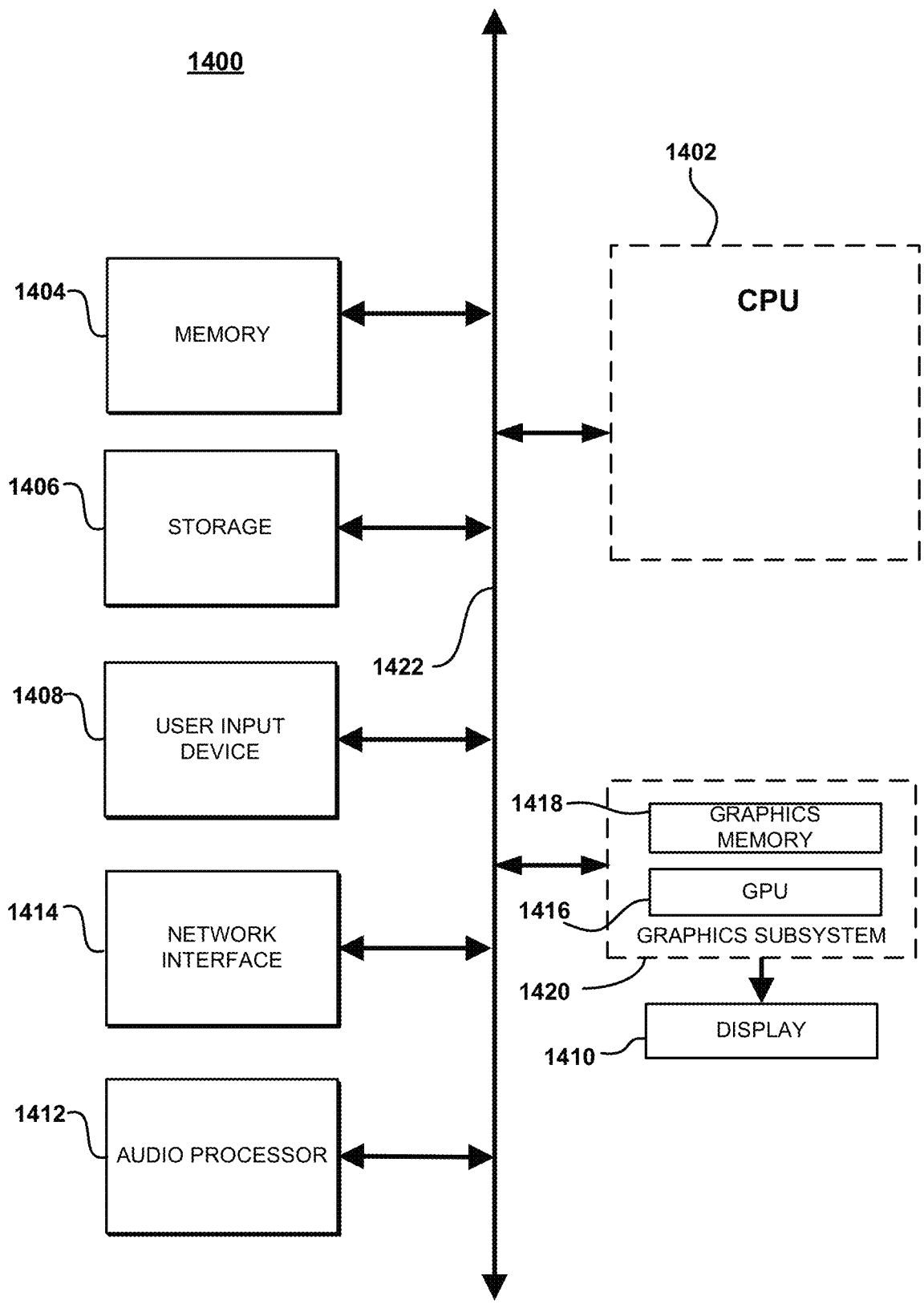
FIG. 14 illustrates components of an example device that can be used to perform aspects of the various embodiments of the present disclosure.

FIG. 14 illustrates components of an example device 1400 that can be used to perform aspects of the various embodiments of the present disclosure. This block diagram illustrates the device 1400 that can incorporate or can be a personal computer, a smart phone, a video game console, a personal digital assistant, a server or other digital device, suitable for practicing an embodiment of the disclosure. The device 1400 includes a CPU 1402 for running software applications and optionally an operating system. The CPU 1402 includes one or more homogeneous or heterogeneous processing cores. For example, the CPU 1402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 1400 can be a localized to a player playing a game segment (e.g., game console), or remote from the player (e.g., back-end server processor), or one of many servers using virtualization in a game cloud system for remote streaming of gameplay to clients.

A memory 1404 stores applications and data for use by the CPU 1402. A storage 1406 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 1408 communicate user inputs from one or more users to the device 1400. Examples of the user input devices 1408 include keyboards, mouse, joysticks, touch pads, touch screens, still or video recorders/cameras, tracking devices for recognizing gestures, and/or microphones. A network interface 1414 allows the device 1400 to communicate with other computer systems via an electronic communications network, and may include wired or wireless communication over local area networks and wide area networks, such as the internet. An audio processor 1412 is adapted to generate analog or digital audio output from instructions and/or data provided by the CPU 1402, the memory 1404, and/or data storage 1406. The components of device 1400, including the CPU 1402, the memory 1404, the data storage 1406, the user input devices 1408, the network interface 1414, and an audio processor 1412 are connected via a data bus 1422.

A graphics subsystem 1420 is further connected with the data bus 1422 and the components of the device 1400. The graphics subsystem 1420 includes a graphics processing unit (GPU) 1416 and a graphics memory 1418. The graphics memory 1418 includes a display memory (e.g., a frame buffer) used for storing pixel data for each pixel of an output image. The graphics memory 1418 can be integrated in the same device as the GPU 1416, connected as a separate device with the GPU 1416, and/or implemented within the memory 1404. Pixel data can be provided to the graphics memory 1418 directly from the CPU 1402. Alternatively, the CPU 1402 provides the GPU 1416 with data and/or instructions defining the desired output images, from which the GPU 1416 generates the pixel data of one or more output images. The data and/or instructions defining the desired output images can be stored in the memory 1404 and/or the graphics memory 1418. In an embodiment, the GPU 1416 includes three-dimensional (3D) rendering capabilities for generating pixel data for output images from instructions and data defining the geometry, lighting, shading, texturing, motion, and/or camera parameters for a scene. The GPU 1416 can further include one or more programmable execution units capable of executing shader programs.

The graphics subsystem 1414 periodically outputs pixel data for an image from the graphics memory 1418 to be displayed on the display device 1410. The display device 1410 can be any device capable of displaying visual information in response to a signal from the device 1400, including a cathode ray tube (CRT) display, a liquid crystal display (LCD), a plasma display, and an organic light emitting diode (OLED) display. The device 1400 can provide the display device 1410 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUS.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims

The invention claimed is:

1. A method generating an image according to a style, comprising:
receiving a textual description describing a first image;
applying an artificial intelligence (AI) model to determine the style of a second image based on the textual description, the first image, a plurality of descriptions, and a plurality of images to generate a suggestion, wherein the style provides a context to the second image, wherein the style is lacking in the first image, wherein said applying the AI model includes:
identifying each word of the textual description as being esoteric or exoteric;
assigning a first weight to said each word of the textual description based on whether the word is esoteric or exoteric; and
determining the style based on the first weight;
generating the second image with the suggestion according to the style; and
providing the second image to a client device for display.

2. The method of claim 1, wherein said applying the AI model includes:
identifying each word of the textual description as belonging to a first lexical category or a second lexical category;
assigning a second weight to said each word of the textual description according to the first lexical category or the second lexical category; and
determining the style based on the second weight.

3. The method of claim 1, wherein said applying the AI model includes:
identifying two or more words of the textual description as belonging the same one of a plurality of lexical categories;
identifying locations of the two or more words in the textual description;
assigning a plurality of weights to the two or more words based on the locations; and
determining the style based on the plurality of weights.

4. The method of claim 1, wherein said applying the AI model includes:
identifying a plurality of gaze directions of a user from whom the textual description is received;
assigning a plurality of weights to two or more words of the textual description based on the plurality of gaze directions; and
determining the style based on the plurality of weights.

5. The method of claim 1, wherein said applying the AI model includes:
identifying amounts of emphasis by one or more users on audio data describing the textual description;
assigning a plurality of weights to two or more words of the textual description based on the amounts of emphasis; and
determining the style based on the plurality of weights.

6. The method of claim 1, wherein said applying the AI model includes:
identifying amounts of input variables used for inputting the textual description;
assigning a plurality of weights to two or more words of the textual description based on the amounts of input variables; and
determining the style based on the plurality of weights.

7. The method of claim 1, wherein the suggestion is a textual description.

8. The method of claim 1, wherein the suggestion includes a reordering of words of the textual description, or a reduction in a number of the words of the textual description, or a combination thereof.

9. The method of claim 1, further comprising:
providing the suggestion to the client device;
receiving a response to the suggestion, wherein the response indicates an acceptance or a denial of the suggestion.

10. A server system for customizing an image based on user preferences, comprising:
a processor configured to:
receive a textual description describing a first image;
apply an artificial intelligence (AI) model to determine a style of a second image based on the textual description, the first image, a plurality of descriptions, and a plurality of images to generate a suggestion, wherein the style provides a context to the second image, wherein the style is lacking in the first image, wherein to apply the AI model, the processor is configured to:
identify each word of the textual description as being esoteric or exoteric;
assign a first weight to said each word of the textual description based on whether the word is esoteric or exoteric; and
determine the style based on the first weight;
generate the second image with the suggestion according to the style;
provide the second image to a client device for display; and
a memory device coupled to the processor.

11. The server system of claim 10, wherein to apply the AI model, the processor is configured to:
identify each word of the textual description as belonging to a first lexical category or a second lexical category;
assign a second weight to said each word of the textual description according to the first lexical category or the second lexical category; and
determine the style based on the second weight.

12. The server system of claim 10, wherein to apply the AI model, the processor is configured to:
identify two or more words of the textual description as belonging the same one of a plurality of lexical categories;
identify locations of the two or more words in the textual description;
assign a plurality of weights to the two or more words based on the locations; and
determine the style based on the plurality of weights.

13. The server system of claim 10, wherein to apply the AI model, the processor is configured to:
identify a plurality of gaze directions of a user from whom the textual description is received;
assign a plurality of weights to two or more words of the textual description based on the plurality of gaze directions; and
determine the style based on the plurality of weights.

14. The server system of claim 10, wherein to apply the AI model, the processor is configured to:
identify amounts of emphasis by one or more users on audio data describing the textual description;
assign a plurality of weights to two or more words of the textual description based on the amounts of emphasis; and
determine the style based on the plurality of weights.

15. The server system of claim 10, wherein to apply the AI model, the processor is configured to:
identify amounts of input variables used for inputting the textual description; and
assign a plurality of weights to two or more words of the textual description based on the amounts of input variables; and
determine the style based on the plurality of weights.

16. A non-transitory computer-readable medium containing program instructions for generating an image according to a style, wherein execution of the program instructions by one or more processors of a computer system causes the one or more processors to carry out operations of:
receiving a textual description describing a first image;
applying an artificial intelligence (AI) model to determine the style of a second image based on the textual description, the first image, a plurality of descriptions, and a plurality of images to generate a suggestion, wherein the style provides a context to the second image, wherein the style is lacking in the first image, wherein the operation of applying the AI model includes:
identifying each word of the textual description as being esoteric or exoteric;
assigning a first weight to said each word of the textual description based on whether the word is esoteric or exoteric; and
determining the style based on the first weight;
generating the second image with the suggestion according to the style; and
providing the second image to a client device for display.

17. The non-transitory computer-readable medium of claim 16, wherein the operation of applying the AI model includes:
identifying each word of the textual description as belonging to a first lexical category or a second lexical category;
assigning a second weight to said each word of the textual description according to the first lexical category or the second lexical category; and
determining the style based on the second weight.

18. The non-transitory computer-readable medium of claim 16, wherein the operation of applying the AI model includes:
identifying two or more words of the textual description as belonging the same one of a plurality of lexical categories;
identifying locations of the two or more words in the textual description;
assigning a plurality of weights to the two or more words based on the locations; and
determining the style based on the plurality of weights.

* * * * *